United States Patent [19]

Tomitaka

[11] Patent Number: 5,355,163
[45] Date of Patent: Oct. 11, 1994

[54] VIDEO CAMERA THAT AUTOMATICALLY MAINTAINS SIZE AND LOCATION OF AN IMAGE WITHIN A FRAME

[75] Inventor: Tadafusa Tomitaka, Chiba, Japan

[73] Assignee: Sony Corporation, Tokyo, Japan

[21] Appl. No.: 120,927

[22] Filed: Sep. 15, 1993

[30] Foreign Application Priority Data

Sep. 28, 1992 [JP] Japan ............................ 4-282505
Nov. 7, 1992 [JP] Japan ............................ 4-322652

[51] Int. Cl.$^5$ .......................................... H04N 9/64
[52] U.S. Cl. ................................... 348/234; 348/253; 348/256; 348/208
[58] Field of Search ............... 358/28, 168, 38, 41, 358/909, 906, 27, 520, 522; 348/222, 234, 256, 208, 253, 711; H04N 9/64

[56] References Cited

U.S. PATENT DOCUMENTS 4,953,008 8/1990 Kaye ............................... 358/28

Primary Examiner—James J. Groody
Assistant Examiner—Sherrie Hsia
Attorney, Agent, or Firm—Lewis H. Eslinger; Jay H. Maioli

[57] ABSTRACT

A video camera system can track or follow the moving object without influence by other objects outside the desired image. Detection feature patterns are formed after brightness and hue frequency feature data is obtained on the basis of image information of the detection measurement frame. The position of the detection measurement frame having a feature pattern with the largest similarity to the standard feature pattern obtained from the standard measurement frame is determined. An imaging condition of a camera is controlled on the basis of the position information of the detection measurement frame.

21 Claims, 16 Drawing Sheets

VIDEO CAMERA THAT AUTOMATICALLY MAINTAINS SIZE AND LOCATION OF AN IMAGE WITHIN A FRAME

BACKGROUND OF THE INVENTION

1. Field of the Invention

This invention relates to a video camera system, and more particularly to an improvement of a video camera system adapted to automatically follow changes of the object seen in the visual field of the video camera in order to provide a suitable image.

2. Description of the Related Art

Nowadays, a single-lens reflex camera having an automatic zooming function has been used. Such camera has a CCD (charge coupled device) line sensor determining a correct distance between the object and the camera and a zoom motor for the automatic zooming function.

According to the automatic zooming camera system of the conventional single-lens reflex camera, it is adapted to restrict the object to be shot to adult persons, the camera user previously selects one of the face-up shot, bust shot, and full body shot by pushing buttons, and the zoom motor is driven according to the position of the zoom lens after the particular position of the zoom lens corresponding to the distance between the lens position and the object, which distance being previously programmed according to the particular kind of the shot, is determined.

Because such single-lens reflex camera provides a CCD line sensor for automatic focusing, and the CCD line sensor can judge whether it is out of focus before or behind and correctly determine the distance to the object, it is possible to obtain or structure an auto-zooming system relatively easily.

In addition, there have been automatic tracking apparatus which are adapted to automatically track or follow the change of the object or the moving object in the visual field of the video camera. According first proposed conventional object tracking apparatus of a video camera, it memorizes a peak value of high-frequency part of a brightness signal in the measurement frame and recognizes motion of the object as the peak value changes.

According to second proposal of such automatic object tracking apparatus of a video camera, it takes a matching of representative points of luminance signals in before and after fields within the measurement frame in order to form a motion vector, and supposes the motion vector in the measurement frame as a motion of the object.

The conventional automatic zooming systems of the single-lens reflex camera fail to be employed in the video camera having an automatic focusing system of the so-called mountain-climbing control type, since the conventional automatic zooming systems can not correctly measure the distance to the object.

The former or first object automatic tracking apparatus has a merit of simple structure of the whole mechanism. However, it has a problem of failing to track an object of a man if, for example, there are trees in the background within the measurement frame as well as the man. The reason of such problem resides in that the high frequency component of the tree becomes the largest peak.

The latter or second automatic tracking method uses basically signals outputted when the peak is occurred, so that the method is sensitive to noise resulting in malfunction of the automatic tracking apparatus in a taking image environment with low brightness. Theoretically, because the second conventional automatic tracking method picks up the high frequency component, it is apprehensive that the tracking apparatus fails to automatically track the objects with low contrast.

Furthermore, the second tracking method can not or only with difficulty judge whether the calculated motion vector is owing to shaking of hands of a user holding the video camera or motion of the object, resulting in erroneous operation of the video camera or the tracking apparatus therein.

SUMMARY OF THE INVENTION

In view of the foregoing, an object of this invention is to provide a video camera system enabling to stably and effectively pick up a quantity of features of the object in the visual field, thereby automatically tracking the motion of the object simply and surely.

The foregoing object and other objects of this invention have been achieved by the provision of a video camera system comprising:a picture element information forming means 1, 5, 6 and 7 for forming picture elements structuring display plane PIC on the basis of imaging output signal of the object to be taken an image; standard measurement frame setting means 16, 17, 15 and SP3 for setting standard measurement frame FMXR of a predetermined size at a predetermined position on the display plane PIC; detection measurement frame setting means 16, 17, 15 and SP3 for setting a detection measurement frames FMX1 to FMX3 and FMXD of a predetermined size on the display plane PIC; a standard frequency characteristic data forming means 19, 20 and 16 for forming standard frequency characteristic data YStd (i), Hue Std (i) of hue angle and/or brightness level on the basis of brightness information and/or hue information of the image within the standard measurement frame FMXR; detection frequency characteristic data forming means 19, 20 and 16 for forming detection frequency characteristic data YSmall (i), Hue Small (i), Y (x, y), (i), Hue (x, y) (i) of brightness and/or hue angle on the basis of brightness information and/or hue information of the image within the detection measurement frame FMX1 to FMX3 and FMXD; detection measurement frame determining means 16, SP5 and SP15 for determining a similarity of the standard frequency characteristic data and/or detection frequency characteristic data in order to determine the detection measurement frame having detection frequency characteristic data of a large similarity; and picture element information change control means 16, SP6 and SP16 for driving and controlling the picture element information forming means 1, 5, 6 and 7 so as to enter image information of the determined detection measurement frame into the standard measurement frame.

In the operation of the video camera system of this invention, the picture element information within the standard measurement frame FMXR of the picture element information of the object is changed to the standard frequency characteristic data YStd (i), Hue Std (i) concerning brightness level and/or hue angle by means of the standard frequency characteristic data forming means 19, 20 and 16, and the picture element information within the detection measurement frames FMX1 to FMX3 and FMXD is changed to the detection frequency characteristic data YSmall (i), Hue Small (i), Y (x, y) (i), Hue (x, y) (i) concerning the brightness level or hue angle by means of the detection frequency characteristic data forming means 19, 20 and 16. The detection frequency characteristic data having large similarity concerning the standard frequency characteristic data are determined by the detection measurement frame determining means 16, SP5 and SP15 and the picture element information forming means 1, 5, 6 and 7 are driven and controlled by the picture element information changing controlling means 16, SP6 and SP16 so as to enter the picture element information within the determined detection measurement frame.

As described above, the video camera system of this invention can automatically track and control the object so as to enter in the standard frame of the display plane, by of using frequency characteristic data and expressing the feature of the image. Consequently, the video camera system can be formed without difficulty.

According to the present invention, a position of the detection measurement frame having a large similarity on the basis of the frequency characteristic data concerning the brightness information and hue information in the predetermined measurement frame is measured in order to control the image taking condition of the video camera on the object. Consequently, it is easy to provide a video camera system enabling surely and adaptively to operate and match any change of the object relative to the video camera.

The nature, principle and utility of the invention will become more apparent from the following detailed description when read in conjunction with the accompanying drawings in which like parts are designated by like reference numerals or characters.

DETAILED DESCRIPTION OF THE INVENTION

Preferred embodiments of this invention will be described with reference to the accompanying drawings:

(1) First Embodiment

Figure 1:
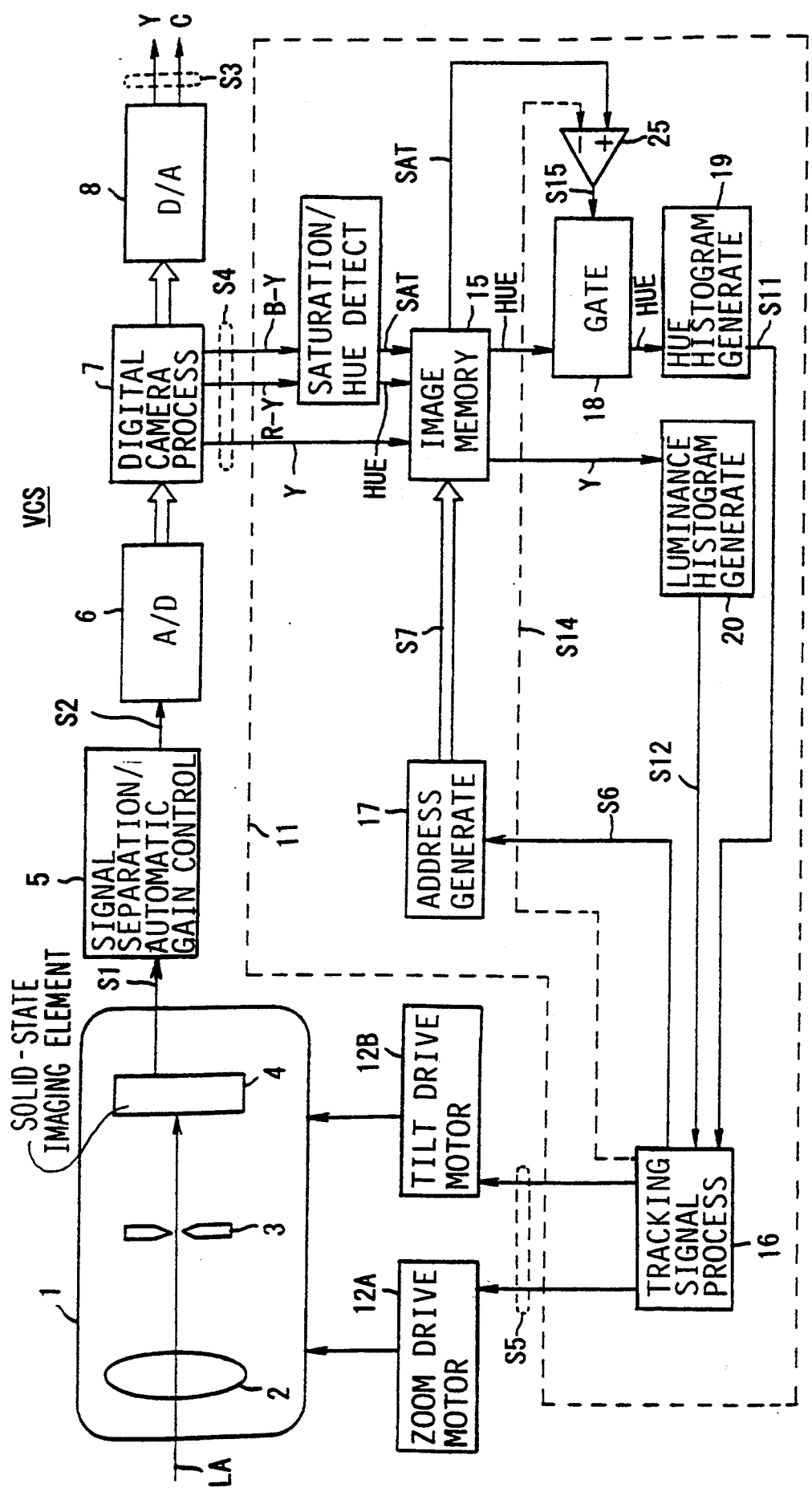
FIG. 1 is a block diagram of the first embodiment of the video camera system according to the present invention.

In FIG. 1, VCS denotes generally a construction of a video camera system in which an imaging light LA from the object whose image is to be taken is received by a solid-state image taking element 4 consisting of, for example, a CCD (charge coupled device) after passing through a lens 2 and an iris 3 in a lens block section 1, and imaging output signal S1 expressing the image of the object is given to a signal separation/automatic gain control circuit section 5.

The signal separation/automatic gain control circuit section 5 samples and holds the imaging output signal S1 and controls the control signal from an automatic iris AE (not shown) so as to make the imaging output signal S1 have a predetermined gain. The thus obtained imaging output signal S2 is supplied from the section 5 to a digital camera processing circuit 7 through an analog/digital conversion circuit section 6.

The digital camera processing circuit 7 forms brightness signal Y and chroma signal C on the basis of the imaging output signal S2 and sends out the brightness signal Y and chroma signal C as video signals S3 through a digital/analog conversion circuit In addition, the digital camera processing circuit 7 supplies brightness signal Y and color difference signals R-Y and B-Y of object tracking detection signal S4 to a tracking control circuit section 11. The tracking control circuit section 11 outputs tracking control signals S5 to a zooming drive motor 12A and tilting drive motor 12B used for the lens block portion 1 on the basis of the object tracking detection signal S4.

The tracking control circuit section 11 gives color difference signals R-Y and B-Y to a saturation level/hue detection circuit 14 to form a hue signal HUE and a saturation signal SAT and memorizes the signals HUE and SAT together with brightness signal Y in an image memory 15 consisting of, for example, a field memory at a unit of picture element.

The saturation level/hue detection circuit 14 converts color difference signals R-Y and B-Y from orthogonal coordinates to curvilinear coordinates to form the hue signal HUE and the saturation level signal SAT, thereby recognizing the object on the basis of sight stimulation for making the man perceive the object by means of brightness signal Y, hue signal HUE, and saturation level signal SAT.

Figure 2:
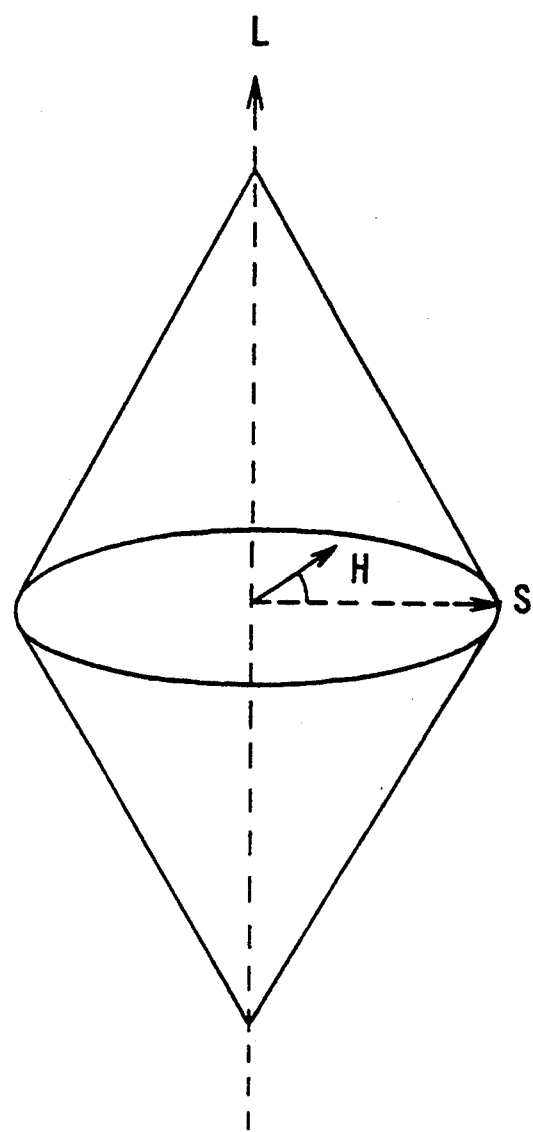
FIG. 2 is a schematic diagram explaining HLS color coordinates expressing sight stimulus.

By the way, in general, the sight stimulation which the man perceives can be shown in FIG. 2 and expressed by color coordinates system provided with L axis and SH plane perpendicular to the L axis forming the so-called HLS system.

L axis depicts a lightness corresponding to the brightness signal Y. The SH plane is expressed by curvilinear coordinates perpendicular to the L axis. On the SH plane, S shows a saturation and is expressed by the distance from the L axis. H shows a hue and is expressed by an angle measured from the direction of color difference signal R-Y of 0 degree.

All colors of the solid body shown by the HLS system become white when the light source becomes bright, or the SH plane or color coordinates rises along the L axis. During such rising of the color coordinates, saturation level S lessens. On the contrary, when the light source diminishes in its lightness, the color coordinates or SH plane lowers along the L axis and all colors become black, together with the saturation level S decreased.

According to the features of such HLS color coordinates, the saturation level S and brightness Y are easily influenced by lightness of the light source, so that it is difficult to say that these saturation level and brightness are good parameters expressing a quantity of feature of the object. On the contrary, it is apparent that a hue H expressing the quantity of a feature particular to the object is difficult to be influenced by the light source.

However, when the color of the object resides near the L axis or the color is white, black or gray, the hue signal H fails to have a meaningful of information and, at the worst case of the image having a bad S/N ratio, the white color appeared on the image may have vectors of various hues H.

In order to solve the problem, the tracking control circuit section 11 of the present invention uses the features of such HLS color coordinates. The tracking control circuit section 11 picks up the features of the object and drives the zooming drive motor 12A and the tilting drive motor 12B so as to track the changing object when its feature changes resulting in an obtaining of video signals S3 zooming-processed, thereby suitably tracking the moving object.

Figure 3:
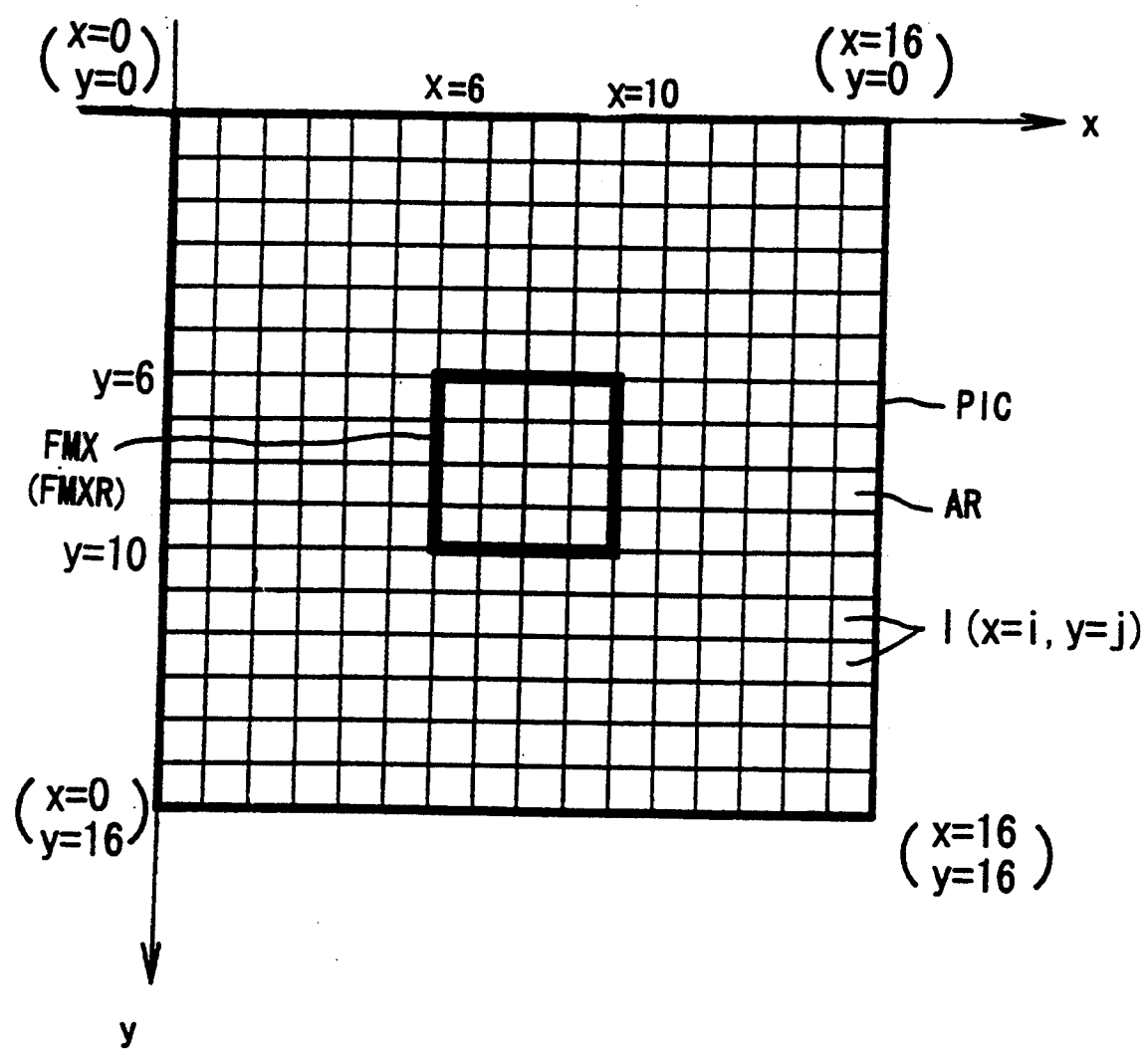
FIG. 3 is a schematic diagram explaining the standard measurement frame FMR.

That is, the picture element information constructing the object tracking detection signal S4 memorized in the image memory 15 is divided by means of an address signal S7 supplied from an address generation circuit 17 which generates the address signal S7 based on a block designating signal S6 sent from a tracking signal processing circuit 16 having a micro processor, so as to divide, as shown in FIG. 3, the display plane PIC formed substantially within the image memory 15 into the block consisting of the predetermined sized unit regions AR on the basis of the XY rectangular coordinates (x, y).

As described above, data of each picture element consisting of the display plane PIC of the image memory 15 are read out at every unit region and processed as one block of image information at every unit region AR.

According to this embodiment of the video camera system, the display plane or picture window PIC is divided respectively into sixteen unit regions AR both along x direction and y direction. Consequently, designating the coordinates x=i, y=j (for example, the coordinates at the upper left corner) of the rectangular coordinates (x, y) concerning the unit region AR of 16×16 (=256) pieces, the image information I (x=i, y=j) of the designated unit region AR can be respectively read out.

As described above, the hue signal HUE component of the image information I (x=i, y=j) read out for every the unit region AR from the image memory 15 is given to a hue histogram generation circuit 19 through a gate circuit 18. On the contrary, the brightness signal Y component is directly given to a brightness histogram generation circuit 20.

Figure 4:
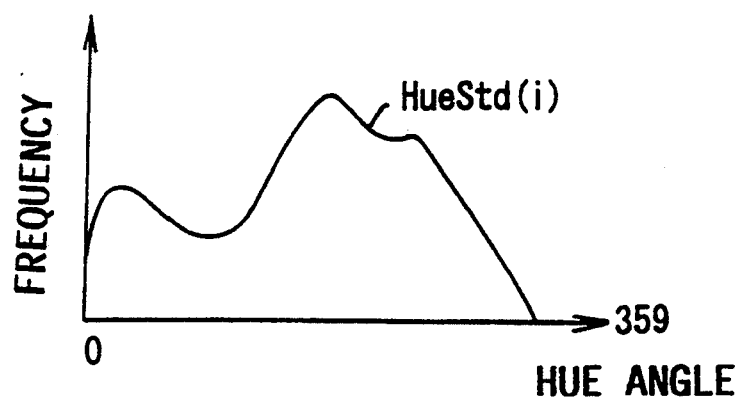
FIG. 4 is a characteristic curve diagram depicting standard hue frequency characteristic obtained from the standard measurement frame FMXR.

The hue histogram generation circuit 19 determines, as shown in FIG. 4, hue frequency characteristic Hue Std (i) expressing the number of the picture elements having respective hue angles 0° to 359° concerning the hue of the picture elements within the measurement frame FMX set on the display plane or picture window PIC, and sends the hue frequency characteristic Hue Std (i) to the tracking signal processing circuit 16 as hue histogram signal S11.

In other words, the hue histogram generation circuit 19 converts the features of hue of the image in the measurement frame FMX into the hue feature pattern expressed by the hue frequency characteristic Hue Std (i).

Figure 5:
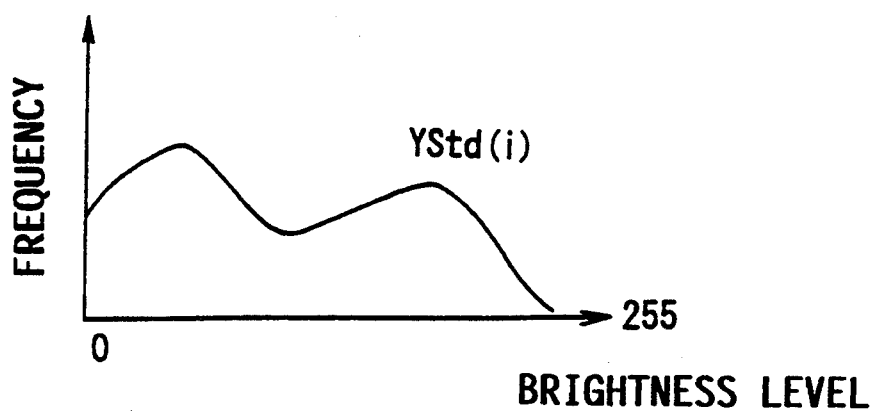
FIG. 5 is a characteristic curve diagram depicting standard brightness frequency characteristic obtained from the standard measurement frame FMXR.

Similarly, the brightness histogram generation circuit 20 determines, as shown in FIG. 5, brightness frequency characteristic YStd (i) expressing the number of the picture elements having respective brightness levels 0 to 255 on the basis of the brightness signal Y concerning the picture elements within the measurement frame FMX set on the display plane PIC, and supplies the brightness frequency characteristic YStd (i) to the tracking signal processing circuit 16 as the brightness histogram signal S12.

As a result, the brightness histogram generation circuit 20 converts the feature of the brightness of the image within the measurement frame FMX to the brightness feature pattern expressed by the brightness frequency characteristic YStd (i) and supplies the pattern to the tracking signal processing circuit 16.

According to this embodiment of the video camera system, it has a hue noise gate signal generation circuit 25 having a comparator for a gate circuit 18 in order to compare a saturation signal SAT read out every picture element from the image memory 15 with a noise judge signal S14 given by the tracking signal processing circuit 16. When the saturation signal SAT is less than the predetermined level, a gate signal S15 for closing the gate circuit 18 is given to the same, thereby preventing the hue signal HUE for the particular picture element from inputting to the hue histogram generation circuit 19.

As a reason for this, when the saturation signal SAT detected in the saturation/hue detection circuit 14 resides near the L axis (FIG. 2), the hue signal HUE of the saturation signal SAT may have a little saturation being hidden in or buried in noise failing to have meaningful information, so such hue signal HUE is removed from the gate circuit 18.

Figure 6:
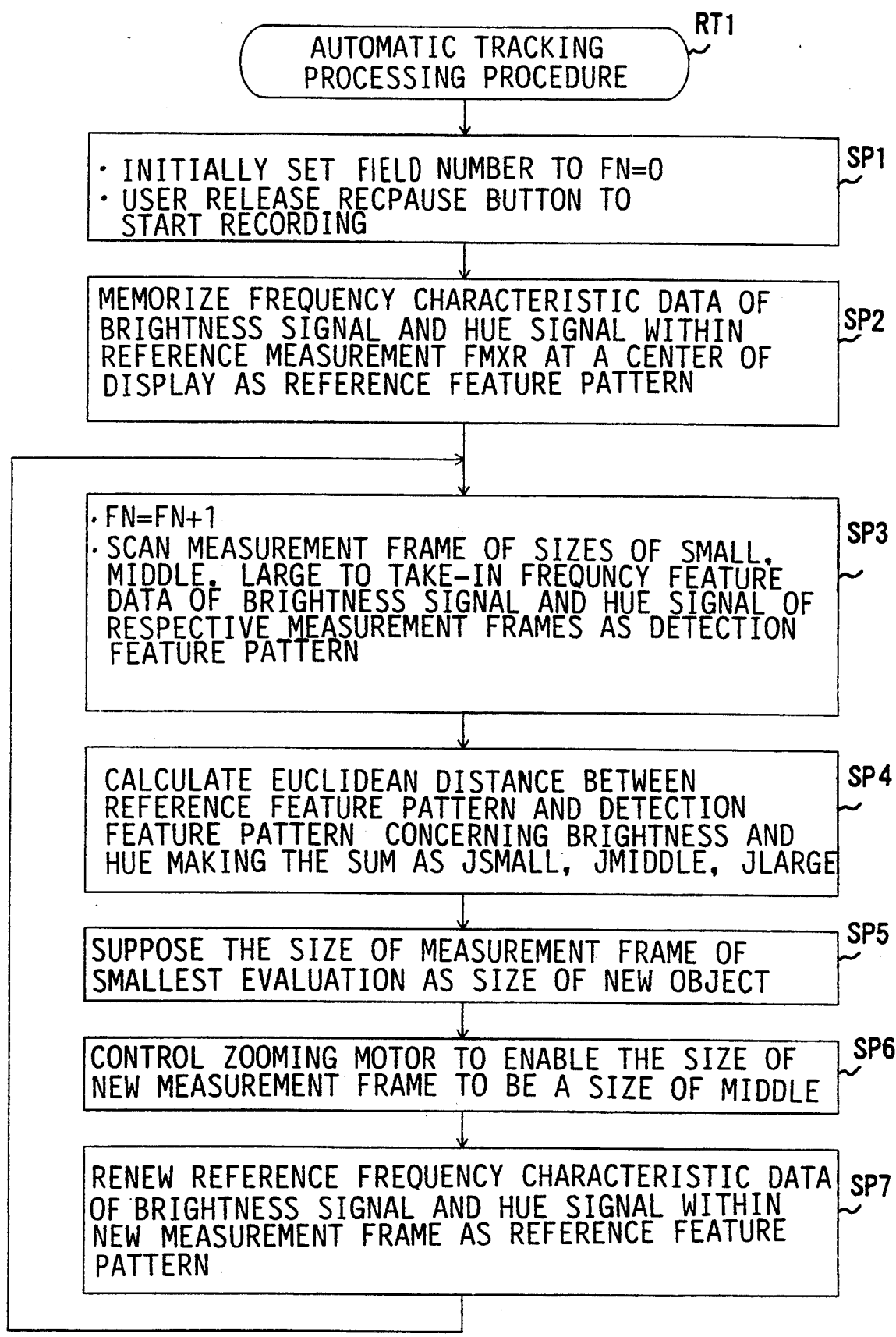
FIG. 6 is a flow chart showing an automatic tracking process procedure according to the first embodiment.
Figure 7:
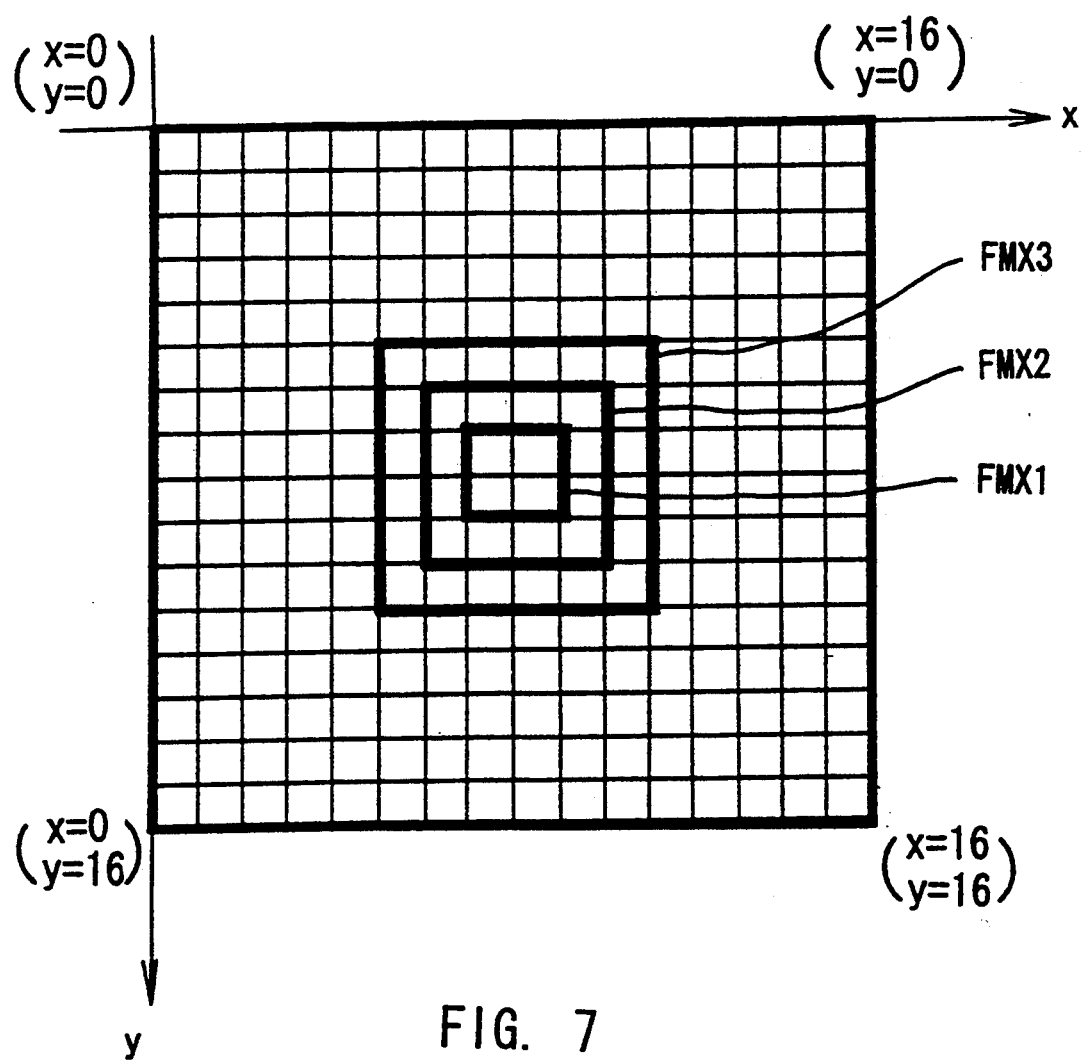
FIG. 7 is a schematic diagram depicting a detection measurement frame.

In the structure of the video camera system described above, the tracking signal processing circuit 16 operates corresponding to the manipulation of the user and carries out an automatic tracking processing procedure RT1 shown in FIG. 6. As a result, the brightness feature pattern and the hue feature pattern are formed in the brightness histogram generation circuit 20 and the hue histogram generation circuit 19 on the basis of the brightness signal Y and hue signal HUE of respective picture elements taken in the image memory 15, so that the zooming operation of the lens block 1 is controlled at the most effective condition.

When the tracking signal process circuit 16 enters into the automatic tracking process procedure RT1 shown in FIG. 6, a field number FN is initially set to FN=0 in a step SP1, the user of the video camera releases a record pause button RECPAUSE waiting for a start of the recording operation.

Then, when the user enables to start the record, the tracking signal processing circuit 16 proceeds to a step SP2, in which frequency characteristic (or histogram) of the brightness signal Y and hue signal HUE or brightness frequency characteristic YSsd (i) (FIG. 5) and hue frequency characteristic Hue Std (i) (FIG. 4) within the standard measurement frame FMXR (in this embodiment, this is selected to unit regions of 4×4 pieces) set at the central position of the display as shown in FIG. 3 are taken from the brightness histogram generation circuit 20 and hue histogram generation circuit 19 as respectively a standard brightness frequency characteristic and standard hue frequency characteristics. These characteristic above are memorized as "standard feature pattern".

Then, the tracking signal processing circuit 16 proceeds to a step SP3 and the field number FN is incremented to FN+1, then the measurement frame FMX sequentially is changed to a plurality of measurement frames FMX1, FMX2 and FMX3, respectively having different sizes, as well as the brightness frequency characteristic YStd (i) and hue frequency characteristic Hue Std (i) concerning respective measurement frames FMX1, FMX2 and FMX3 are taken from the brightness histogram generation circuit 20 and hue histogram generation circuit 19.

In this embodiment of the present invention, a plurality of measurement frames are selected such as a small measurement frame FMX1 consisting of small regions having unit regions AR of 2×2 pieces, a middle measurement frame FMX2 consisting of middle or intermediate regions having unit regions AR of 4×4 pieces, and a large measurement frame FMX3 consisting of a large region having unit regions AR of 6×6 pieces. "Detection feature pattern" of detection brightness and detection hue frequency characteristic YSmall (i) and Hue Small (i), YMiddle (i) and Hue Middle (i), and YLarge (i), Hue Large (i) are taken from respective measurement frames FMX1, FMX2 and FMX3.

Continuously, the tracking signal processing circuit 16, in a step SP4, determines the Euclidean distance between the reference feature pattern and detection feature pattern concerning brightness and hue, and the sums of them are determined as valuation values JSmall, JMiddle and JLarge.

Figure 9:
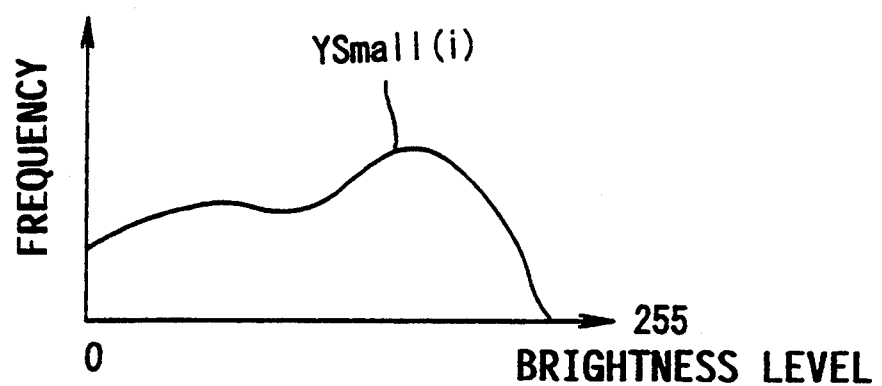
FIG. 9 is a characteristic curve diagram depicting a detection brightness frequency characteristic.

That is, the tracking signal processing circuit 16 calculates using a brightness information of the small measurement frame FMX1, as shown in the following equation (1), the detection brightness frequency characteristic YSmall (i) (FIG. 9) which is the detection brightness frequency characteristic YSmall (i)/4 normalized as a mean value of unit regions AR, and the reference brightness frequency characteristic YStd (i) (FIG. 5) which is the standard frequency characteristic YStd (i)/16 normalized as a mean value of unit regions AR.

$$J1\text{Small} = \sum_{i=0}^{255} |Y\text{Small}(i)/4 - Y\text{Std}(i)/16| \tag{1}$$

The absolute values of the difference between the detection brightness frequency characteristic YSmall (i)/4 and the standard frequency characteristic YStd (i)/16 concerning all the brightness levels i=0 to 255 are added, thereby obtaining a total value which is a small measurement frame brightness Euclidjan distance J1Small expressing a similarity between the image brightness information of the small measurement frame FMX1 and the brightness information of the standard measurement frame FMXR.

Figure 8:
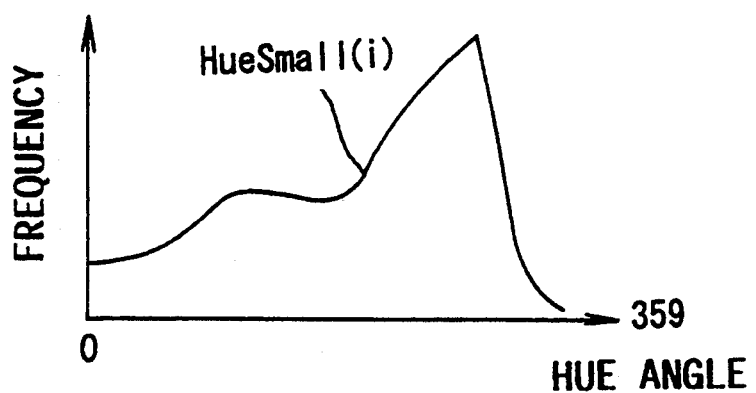
FIG. 8 is a characteristic curve diagram depicting a detection hue frequency characteristic.

Similarly, the tracking signal processing circuit 16 calculates, using a hue information of the small measurement frame FMX1, as shown in the following equation (2), the detection hue frequency characteristic Hue Small (i) (FIG. 8) which is the hue frequency characteristic Hue Small (i)/4 normalized as a mean value of unit regions AR and the reference hue frequency characteristic Hue Std (i) (FIG. 4) which is Hue Std (i)/16 normalized as a mean value of unit regions AR.

$$J2\text{Small} = \sum_{i=0}^{359} |\text{HueSmall}(i)/4 - \text{HueStd}(i)/16| \tag{2}$$

The absolute values of the difference between the Hue Small (i)/4 and Hue Std (i)/16 concerning all hue angles i=0° to 359° are totaled so as to obtain a small measurement frame hue Euclidean distance J2Small expressing the similarity between the image hue information of the small measurement frame FMX1 and the hue information of the standard measurement frame FMXR.

Similarly, the tracking signal processing circuit 16 calculates, using the brightness signal of the image within the middle measurement frame FMX2 as shown by the following equation (3), the normalized standard brightness frequency characteristic YStd (i)/16 and the normalized brightness frequency characteristic YMiddle (i)/16 of the detection brightness frequency characteristic YMiddle (i).

$$J1\text{Middle} = \sum_{i=0}^{255} |Y\text{Middle}(i)/16 - Y\text{Std}(i)/16| \tag{3}$$

The total absolute values of the difference between YStd (i)/16 and YMiddle (i)/16 on all brightness levels i=0 to 255 are calculated as a middle measurement frame brightness Euclidean distance J1Middle depicting the similarity between an image brightness information of the measurement frame FMX2 and a brightness information of the standard measurement frame FMXR.

Also, the tracking signal processing circuit 16 calculates, using the hue information of the image within the middle measurement frame FMX2 as shown by the following equation (4), the total value of the absolute value of the difference between the normalized hue frequency characteristic Hue Middle (i)/16 and the normalized standard hue frequency characteristic Hue Std (i)/16 on all hue angles i=0° to 359° as a middle frame hue Euclidean distance J2Middle depicting the similarity between the image hue information of the middle measurement frame FMX2 and the hue information of the standard measurement frame FMXR.

$$J2\text{Middle} = \sum_{i=0}^{359} |\text{HueMiddle}(i)/16 - \text{HueStd}(i)/16| \quad (4)$$

In addition, the tracking signal processing circuit 16 calculates, using the brightness information of the image within the large measurement frame FMX3 as shown by the following equation (5), the total value of all the values of the absolute value of the difference between the normalized detection brightness frequency characteristic YLarge (i)/36 and the normalized standard brightness frequency characteristic YStd (i)/16 on all the brightness levels i=0° to 255°, as the large measurement frame brightness Euclidean distance J1Large depicting the similarity between the image brightness information of the large measurement frame FMX3 and the brightness information of the standard measurement frame FMXR.

$$J1\text{Large} = \sum_{i=0}^{255} |Y\text{Large}(i)/36 - Y\text{Std}(i)/16| \quad (5)$$

Also, the tracking signal processing circuit 16 calculates, using the hue information of the image of the large measurement frame FMX3 as shown by the following equation (6), the total value of the absolute value on all hue angles i=0° to 359° of the difference between the normalized detection hue frequency characteristic Hue Large (i)/36 and the normalized standard hue frequency characteristic Hue Std (i)/36 on all hue angles i=0° to 255°, as the large measurement frame hue luminance Euclidean distance J2Large depicting the similarity between the hue information of the large measurement frame FMX3 and the hue information of the standard measurement frame FMXR.

$$J2\text{Large} = \sum_{i=0}^{359} |\text{HueLarge}(i)/36 - \text{HueStd}(i)/16| \quad (6)$$

As a result, the similarity between the image of the small measurement frame FMX1, middle measurement frame FMX2 and large measurement frame FMX3, and the image of the standard measurement frame FMXR can be obtained as evaluation values JSmall, JMiddle and JLarge due to the total Euclidean distance of the brightness and the hue as shown by the following equations (7), (8), and (9).

$$\text{JSmall} = \text{J1Small} + \text{J2Small} \quad (7)$$

$$\text{JMiddle} = \text{J1Middle} + \text{J2Middle} \quad (8)$$

$$\text{JLarge} = \text{J1Large} + \text{J2Large} \quad (9)$$

Continuously the tracking signal processing circuit 16 searches for the smallest one of the valuation values JSmall, JMiddle and JLarge on the small measurement frame FMX1, middle measurement frame FMX2 and large measurement frame FMX3, and this smallest one is assumed to be that the size of the object at present in the next step SP5.

Here, when one of the valuation values of JSmall, JMiddle and JLarge becomes the smallest, this means that the image information of thus size measurement frame at present contains image information of the largest similarity with the image information obtained by previous measuring, as well as the measurement frame having a largest continuity between the measurement result at the previous measurement instant and at the present is selected.

The tracking signal processing circuit 16 in the next step SP6 supplies the tracking control signals making the newly selected measurement frame size identical with that of the middle measurement frame FMX2 to the zooming drive motor 12A so as to control adaptively the lens block section 1 at the condition that a continuouity of the previous measurement result is maintained.

Continuously the tracking signal processing circuit 16 is in the next step SP7, the standard brightness frequency characteristic YStd (i) (FIG. 5) and the standard hue frequency characteristic Hue Std (i) (FIG. 4) are taken from the brightness histogram generation circuit 20 and hue histogram generation circuit 19 through the brightness histogram signal S12 and the hue histogram signal S11 in order to memorize a new standard feature pattern, and then returns to the previous step SP3 to be entered into a new tracking processing according to the new standard feature pattern.

By the way, in the step SP5, when the small measurement frame FMX1, for example, is selected, the tracking signal processing circuit 16 in the step SP6 drives the zooming drive motor 12A to a narrow side so as to enlarge the image of the small measurement frame FMX1 to the size of the middle measurement frame FMX2.

On the contrary, when the large measurement frame FMX3 is selected in the step SP5, the tracking signal processing circuit 16 drives the zooming drive motor 12A in the step SP6 to the wide side so as to decrease the size of the object image enabling to display the image within the large measurement frame FMX3 in the middle measurement frame FMXR.

On the contrary, when the middle measurement frame FMX2 is selected in the step SP5, the tracking signal processing circuit 16 in the step SP6 does not drive the zooming drive motor 12A to either the wide-side or the narrow side, as a result, the size of the image of the object is kept so as to be able to continuously display the image within the middle measurement frame FMX2.

According to the structure of the video camera system described above, when a recording starts after the user initially operates the camera to enter the object in the central standard measurement frame FMX of the display and the distance between the video camera and the object increases, the size of the object on the display plane PIC decreases resultantly becoming the content of the detection feature pattern obtained from the small measurement frame FMX1 nearest to the standard feature pattern. As a result, it is necessary to make the tracking signal processing circuit 16 to drive the zooming drive motor 12A to the narrow side and control the size of object in the display plane PIC to suit the size of the standard frame FMXR.

On the contrary, when the object moves toward the video camera, the size of the object on the display plane PIC increases, so that it is possible to obtain the detection feature pattern nearest to the standard feature pattern of the measurement image information from the large measurement frame FMX3. Then the tracking signal processing circuit 16 drives the zooming drive motor 12A to the wide side, thus the size of the object on the display PIC is controlled to suitably enter the standard measurement frame FMXR.

If the position of the object relative to the camera does not change, the size of the object in the display plane PIC is kept at its size enabling to always be contained within the standard measurement frame FMX. As a result, the detection feature pattern obtained from the middle measurement frame FMX2 has the largest similarity to the standard feature pattern. At this time, the tracking signal processing circuit 16 is controlled to prevent the zooming drive motor 12A from driving, so that the size of the object in the display plane PIC is adaptively controlled to be entered in the standard measurement frame FMXR.

As described above, it is possible to control zooming for always making the size of the object in the display plane PIC a predetermined one. Additionally, the frequency features of the picture element number of respective the brightness levels and the phase angles in the measurement frame is used as the quantity feature of the object so that if the display plane PIC is shaken due to the moving hands of the user of the video camera, it is possible to control the zooming operation without an effect of the shaking of the display plane PIC with a simple construction of the whole video camera system.

Because the standard feature patterns are adapted to be sequentially changed with the time elapsed, even when the object turns or the object image changes (for example, when the object of a man takes off his jacket), it is possible to adaptively auto-zoom control the video camera system.

(2) Second Embodiment

Figure 10:
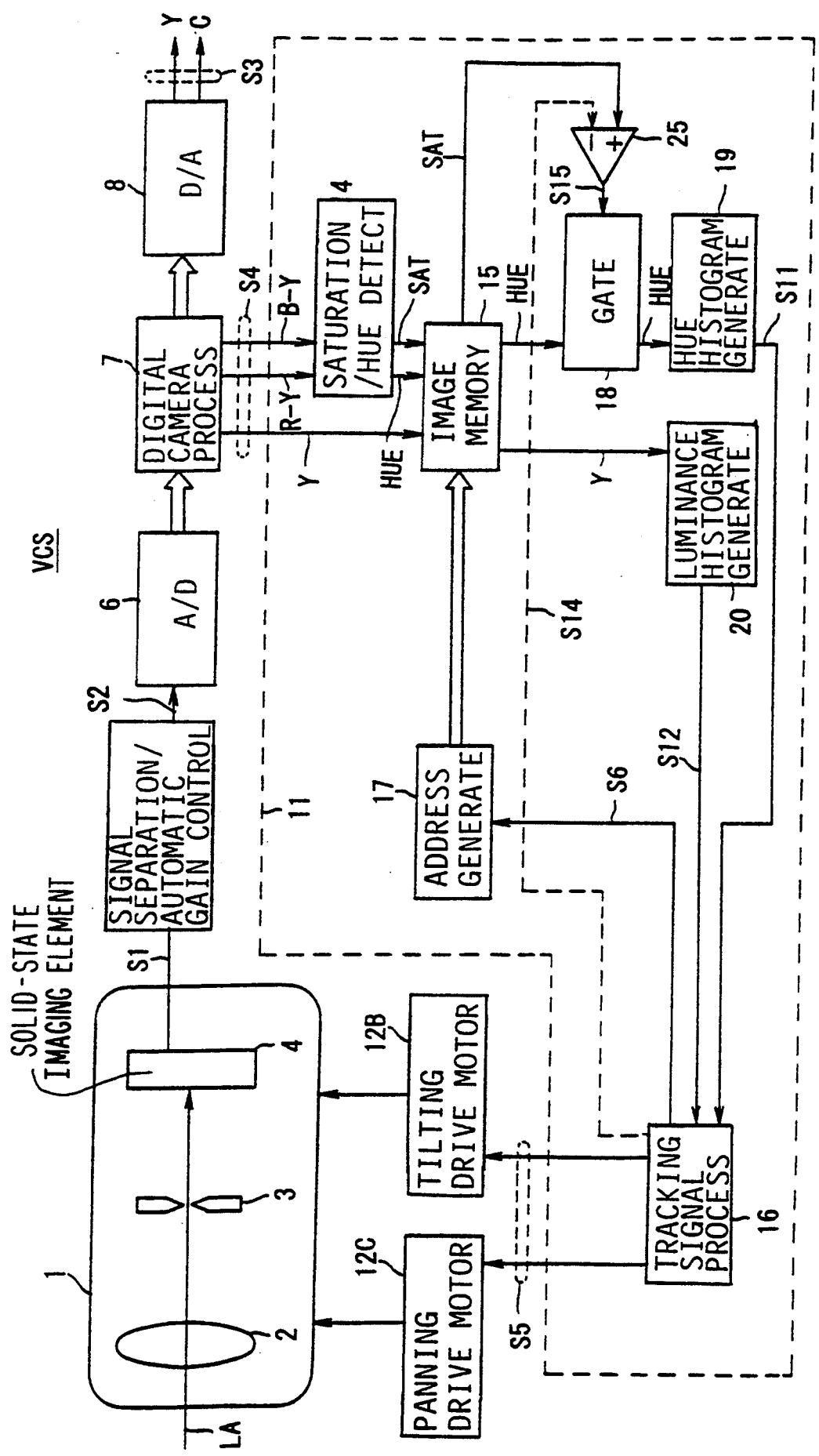
FIG. 10 is a block diagram showing the second embodiment of the video camera system according to the present invention.

FIG. 10 shows the second embodiment of the video camera system VCS according to the present invention. The parts or portions corresponding to that shown in FIG. 1 have the same or corresponding reference numerals. The tracking signal processing circuit 16 is adapted to drive and control the tilting drive motor 12B and a panning drive motor 12C through tracking control signals S5.

Figure 11:
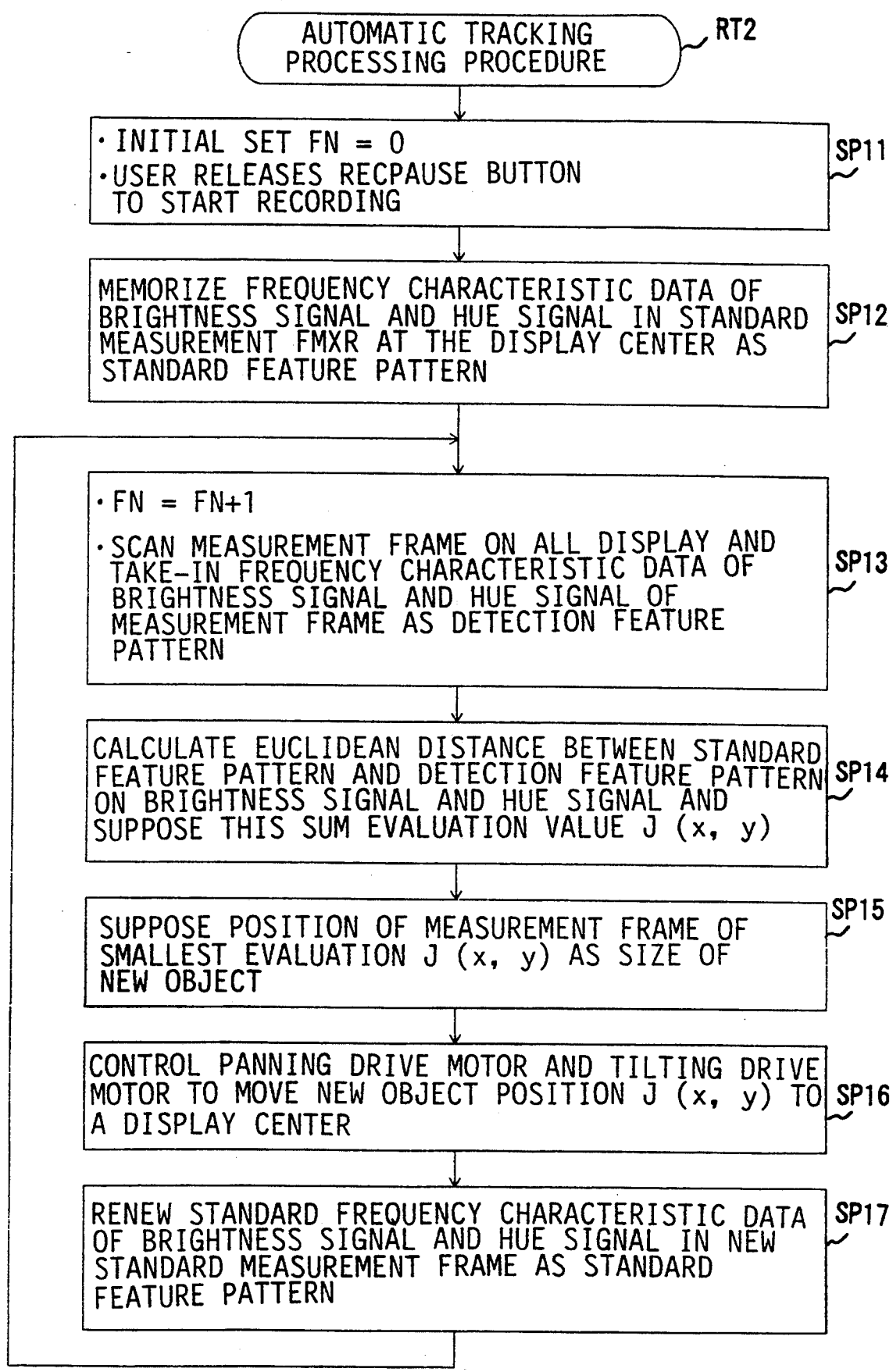
FIG. 11 is a flow chart showing the automatic tracking processing procedure of the second embodiment.

In the structure mentioned above, an automatic tracking processing procedure RT2 shown in FIG. 11 is executed by the tracking signal processing circuit 16 to always display an image of the largest similarity comparing to the image in the standard measurement frame by adaptively controlling the video camera.

When the tracking signal process circuit 16 enters the automatic tracking processing procedure RT2 it initially sets in the step SP11 the frame number FN to FN-0 and becomes at a condition which waits until the user of the video camera system operates the recording button RECPAUSE to release the record pause condition.

The user starts the recording at such condition of the tracking signal process circuit 16, which then proceeds to the step SP12 and designates, as described above with reference to FIGS. 3 to 5, the reference measurement frame FMXR at the center of display plane PIC by the address generation circuit 17 so as to give the brightness signal Y and hue signal HUE corresponding to the picture element within the standard measurement frame to the brightness histogram generation circuit 20 and hue histogram generation circuit 19. As a result, the standard brightness frequency characteristic YStd (i) (FIG. 5) and the standard hue frequency characteristic Hue Std (i) (FIG. 4) are recorded by the characteristic histogram signal S12 and hue histogram signal S11 as the standard feature pattern.

Subsequently, the tracking signal process circuit 16 proceeds to the step SP13, in which the address generation circuit 17 scans the position of the detection measurement frame FMXD so as to pickup the image information on the display plane PIC at a unit of the detection measurement frame FMXD.

Figure 12:
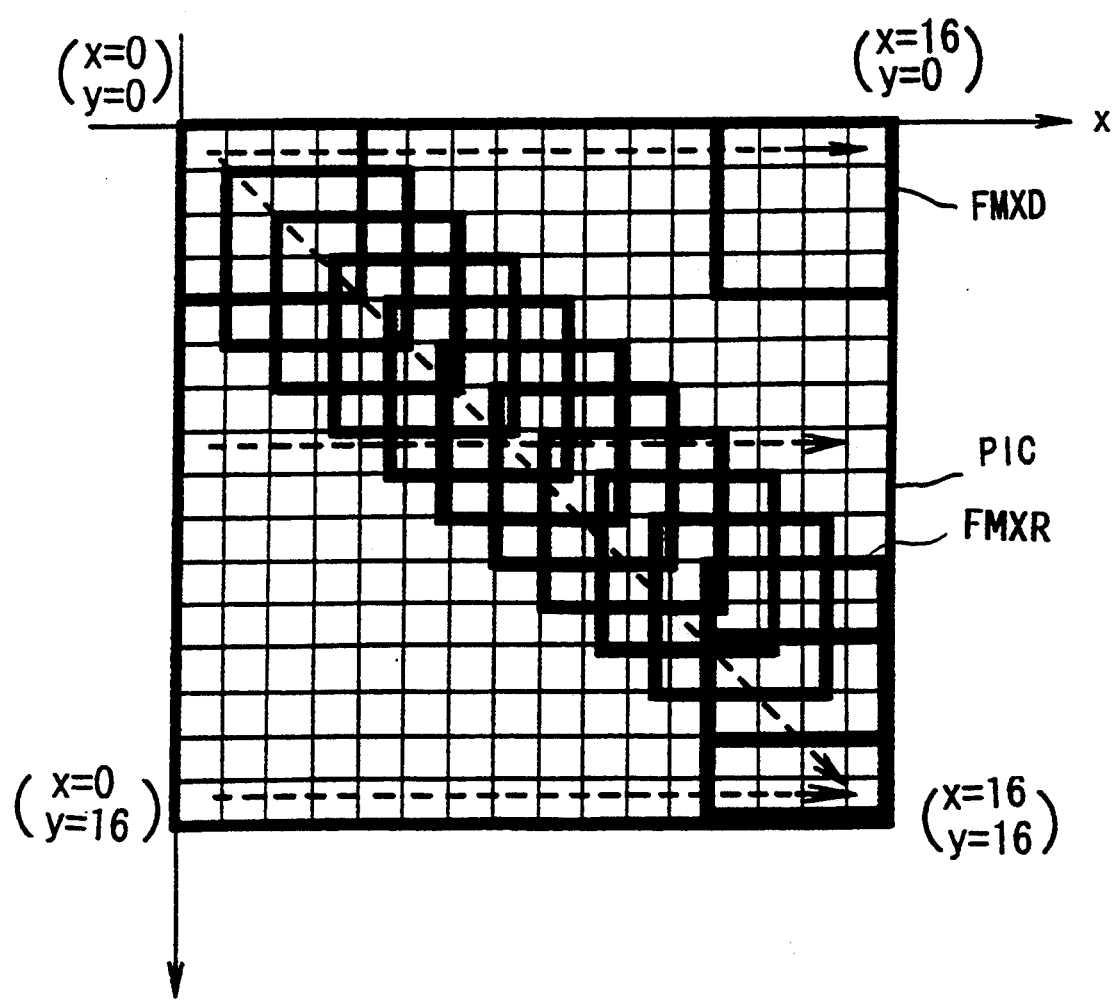
FIG. 12 is a schematic diagram showing the detection measurement frame of the second embodiment.

In this embodiment, the detection measurement frame FMXD has, as shown in FIG. 12, similar to the standard measurement frame FMXR, unit regions AR of $4 \times 4 = 16$ pieces and the address generation circuit 17 scans by sequentially designating the unit region address at the left upper corner of the detection measurement frame FMXD from the left side to the right side and from the upper side to the lower side.

As a result, the detection measurement frame FMXD is scanned to sequentially shift the address $(x, y) = (0, 0)$, $(1, 0),,, (12, 0), (0, 1), (1, 1) \ldots (12, 1) \ldots (0, 12), (1, 12) \ldots (12, 12)$.

Figure 13:
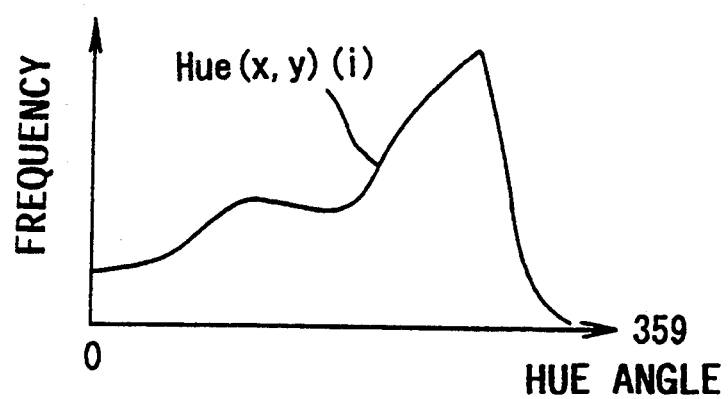
FIG. 13 is a characteristic curve diagram showing a detection hue frequency characteristic obtained from the detection measurement frame shown in FIG. 12.
Figure 14:
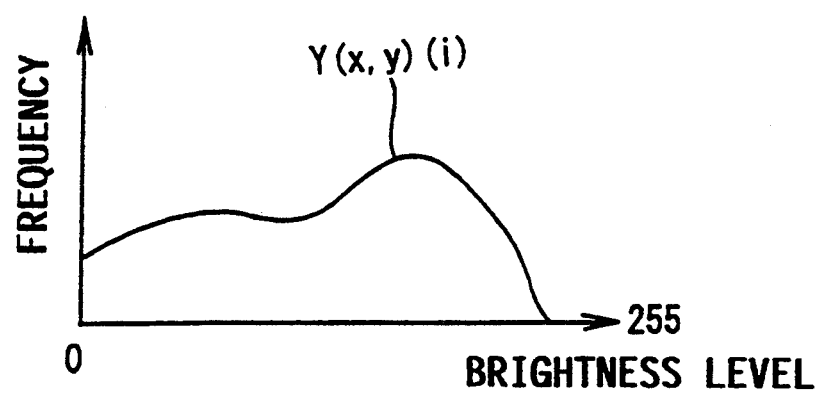
FIG. 14 is a characteristic curve diagram depicting a detection brightness frequency characteristic obtained from the detection measurement frame of FIG. 12.

During such scanning operation, the tracking, signal processing circuit 16 calculates, as shown in FIGS. 13 and 14, the detection hue frequency characteristic Hue (x, y) (i) and the detection brightness frequency characteristic Y (x, y) (i) of the hue information and the brightness information of the image of the detection measurement frame FMXD shifted to the address (x, y) position.

Here, the detection hue frequency characteristic Hue (x, y) (i) shows the hue detection feature pattern of the detection measurement frame FMXD corresponding to the generation frequency of the picture elements of the hue angles 0° to 359° contained in all picture elements of the detection measurement frame FMXD.

On the contrary, the detection brightness frequency characteristic Y (x, y) (i) depicts the brightness detection feature pattern corresponding to the generation frequency of the picture elements of the brightness levels 0 to 255 which all the picture elements contained in the detection measurement frame FMXD have.

Subsequently, the tracking signal processing circuit 16 calculates, in a step SP14, using the brightness signal, as shown by the following equation (10), Euclidean distance J1 (x, y) to total the, absolute values of the difference between the detection brightness frequency feature Y (x, y) (i) and the standard brightness frequency feature YStd (i) concerning the detection measurement frame FMXD and the brightness levels 0 to 255.

$$J1(x,y) = \sum_{i=0}^{255} |Y(x,y)(i) - Y\text{Std}(i)| \quad (10)$$

Thus, the Euclidean distance is obtained as information expressing the similarity of the brightness information in the detection measurement frame FMXD resided at a position of an address (x, y) relative to the brightness information which the image within the standard measurement frame FMXR has.

Also, concerning hue information of the detection measurement frame FMXD, the tracking signal processing circuit 16 totals, as shown by the following equation (11), the absolute values on the hue angles i=0° to 359° of the difference between the detection hue frequency characteristic Hue (x, y) (i) of the detection measurement frame FMXD at the address (x, y) position and the standard hue frequency characteristic Hue Std (i) and calculates Euclidean distance J2 (x, y).

$$J2(x,y) = \sum_{i=0}^{359} |\text{Hue}(x,y)(i) - \text{HueStd}(i)| \quad (11)$$

As a result, it is obtained information depicting the similarity of the detection feature pattern of the image of the detection measurement frame FMXD at the position (x, y) relative to the standard hue feature pattern which the image of the standard measurement frame FMXR has.

The tracking signal processing circuit 16 sums Euclidean distance J1 (x, y) and J2 (x, y) obtained regarding the brightness and the hue as described above and shown by the following equation (12), thereby calculating the evaluation value J (x, y).

$$J(x,y) = J1(x,y) + J2(x,y) \quad (12)$$

The tracking signal processing circuit 16 proceeds to the next step SP15 after obtaining the evaluation value J (x, y) (x=0, 1 ... 12, y=0, 1 ... 12) on the all detection measurement frame FMXD which resides at the scanning positions (x, y) (x=0, 1 ... 12, y=0, 1 ... 12) to determine that the position of the detection measurement frame FMXD at which the evaluation value J (x, y) becomes the smallest is the position of the object in measuring at present. In the next step SP16, the tracking signal processing circuit 16 Gives the tracking control signal S5 to the tilting drive motor 12B and the panning drive motor 12C, to move the new object position (x, y) to the standard measurement frame FMXR (FIG. 3) set at the central position of the display plane PIC.

Subsequently, the tracking signal processing circuit 16 proceeds to a step SP17 and renews the reference frequency characteristic data (FIGS. 4 and 5) of the brightness signal and the hue signal of the image just brought to the reference measurement frame FMXR, and returns to the step SP13 so as to enter the next measurement cycle.

Thus, when the object moves relative to the television camera the tracking signal processing circuit 16 calculates the position of the detection measurement frame FMXD having the image information of the largest similarity to the image information of the standard measurement frame FMXR on the whole picture plane PIC and controls the panning and tilting operations of the television camera to move the detection measurement frame FMXD which has the most similarity to the position of the standard measurement frame FMXR. As a result, it is possible to adaptively move the video camera VCS to follow the motion of the object.

On the contrary, when the object at a position of the reference measurement frame FMXR does not move, it is possible to obtain such evaluation in the step SP14 that the detection feature pattern obtained from the detection measurement frame FMXD residing at the same position as that of the standard measurement frame FMXR has the largest similarity relative to the standard feature pattern, so that the track signal processing circuit 16 controls the video camera system VCS to make the new object continuously reside in the standard measurement frame FMXR by means of the tracking control signal S5.

According to the construction described above, so long as the user has started the recording after the object has been initially placed at the center of the standard measurement frame FMXR, even if the object moves in the display plane PIC after this, the tracking signal processing circuit 16 compares the detection feature pattern obtained on the basis of the frequency characteristic data of the brightness signal and hue signal with the standard feature pattern to be able to surely detect the position after moving, so that the video camera system is able to adaptively track the motion of the object.

In order to attain such operation of the video camera system, there is no need to prepare in particular complicated in circuitry of the video camera system.

Also, according to the video camera system provided with such construction above, because the standard pattern is sequentially renewed or the time elapses, it is possible to automatically track the change of the object, even when the object turns, its image becomes large by advancing toward the camera, or any change happens in the object (for example, when the object is a man, he takes off his jacket).

(3) Third Embodiment

Figure 15:
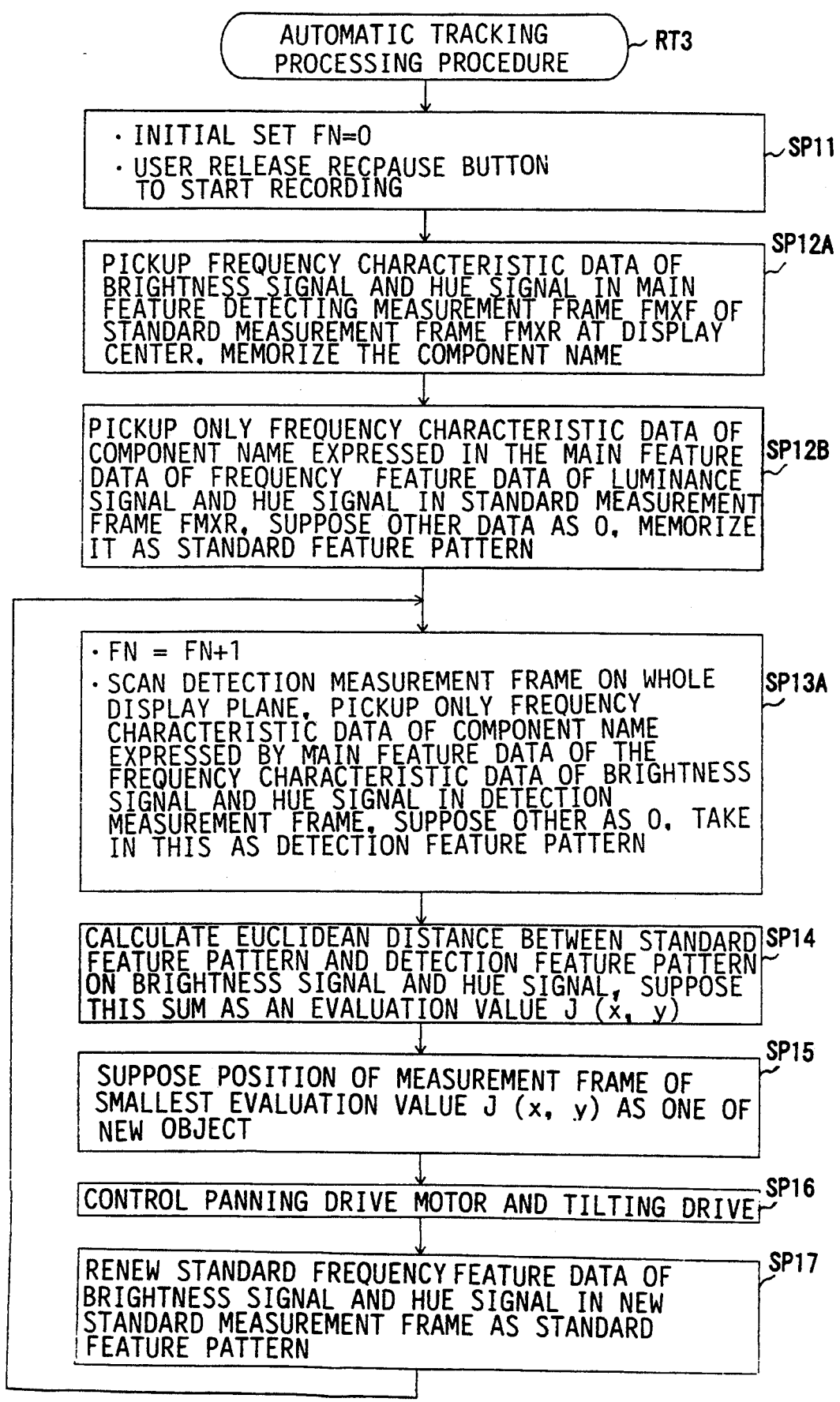
FIG. 15 is a flow chart of the automatic tracking processing procedure of the third embodiment of the video camera system according to the present invention.

FIG. 15 shows the third embodiment of the video camera system according to the present invention. The structure of the video camera system VCS has the same one as that of the second embodiment shown in FIG. 10, except that the tracking signal processing circuit 16 is adapted to execute an automatic tracking processing procedure RT3 as shown in FIG. 15.

The parts and portions of the automatic tracking processing procedure RT3 corresponding to that of the procedure RT2 shown in FIG. 11 have the same symbols. Instead of the step SP12 shown in FIG. 11, the tracking signal processing circuit 16 executes sequentially the steps SP12A and SP12B. In addition, instead of the step SP13 shown in FIG. 11, the tracking signal processing circuit 16 executes the step SP13A.

Figure 16:
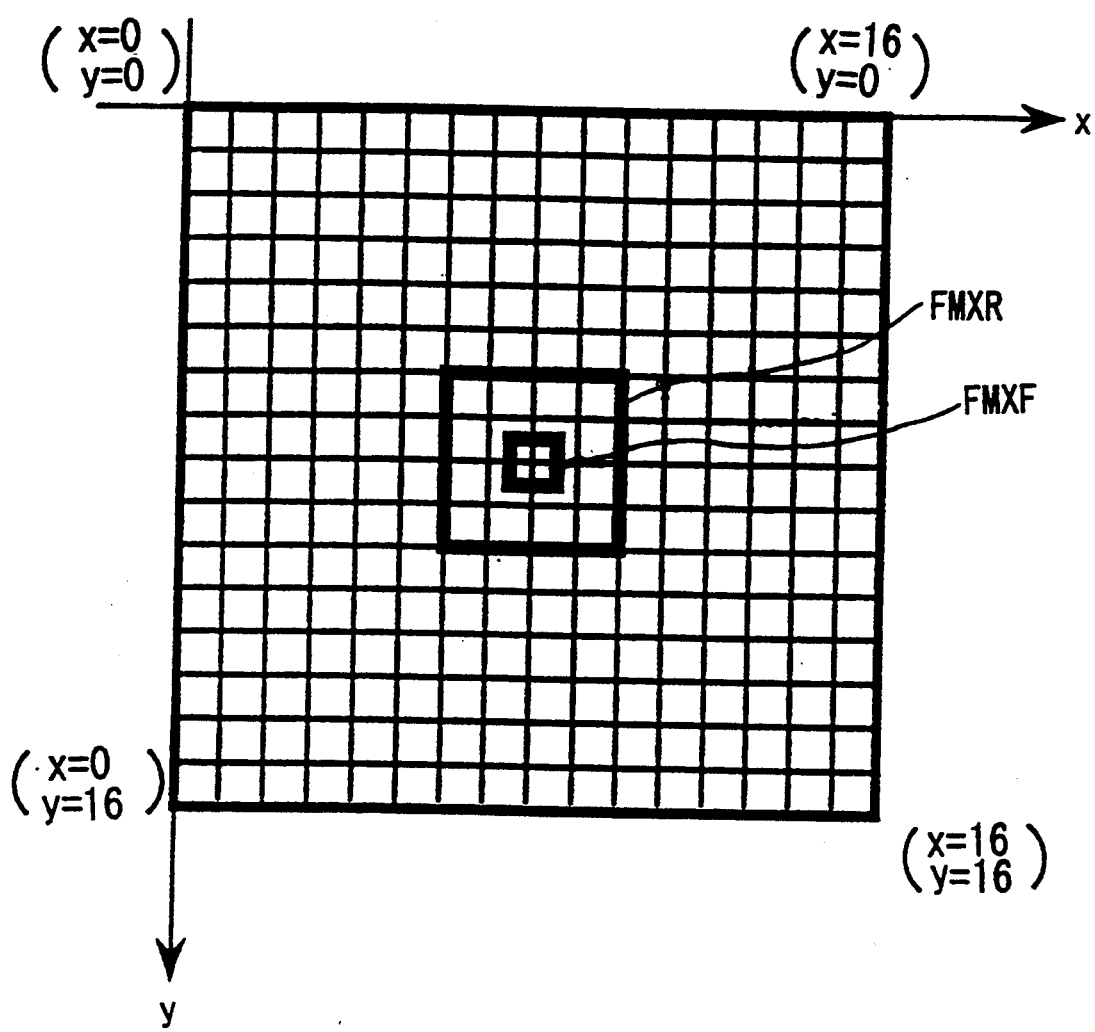
FIG. 16 is a schematic diagram showing a main feature detection measurement frame set in the step SP12A shown in FIG. 15.

That is, the tracking signal processing circuit 16 enters the automatic tracking processing procedure RT3 and executes the step SP11; then as shown in FIG. 16, picks up in the step SP12A the frequency feature data of the brightness signal Y and the hue signal HUE in a main feature detecting measurement frame FMXF having a region smaller than that of the standard measurement frame FMXR set at the center of the display plane PIC, the frame FMXF residing in the frame FMXR; and memorizes the name of component as the main feature data.

In this embodiment, the standard measurement frame FMXR consists of unit region AR of 4×4=16 pieces. On the contrary, the main feature detecting measurement frame FMXF is adapted to have a unit region AR of 1×1=1 piece at the center of the standard measurement frame FMXR.

Figure 17:
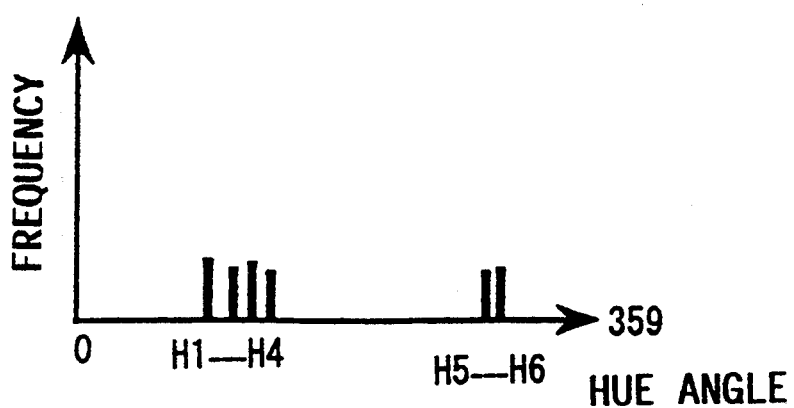
FIG. 17 is a characteristic curve diagram depicting a hue frequency characteristic obtained from the main feature detecting measurement frame FMXF of FIG. 16.
Figure 18:
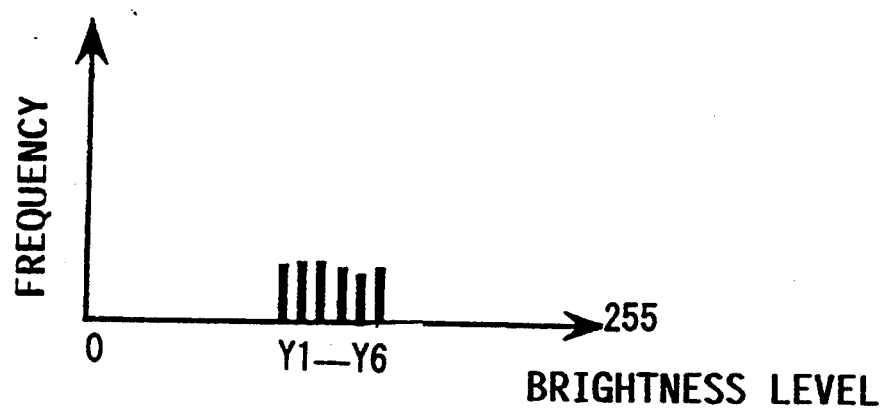
FIG. 18 is a characteristic curve diagram depicting a brightness frequency characteristic obtained from the main feature detecting measurement frame FMXF shown in FIG. 16.

In the processing of the step 12A, the frequency feature data of the brightness signal and the hue signal in the main feature detecting measurement frame FMXF do not all have element names, all hue angles 0° to 359° and brightness levels 0 to 255 as shown in Figs. 17 and 18. In practice, the frequency feature data has only the hue angles H1 to H6 and brightness levels Y1 to Y6 as, for example, six names of the element, thereby expressing distinctly the feature of the fine image portion.

Figure 19:
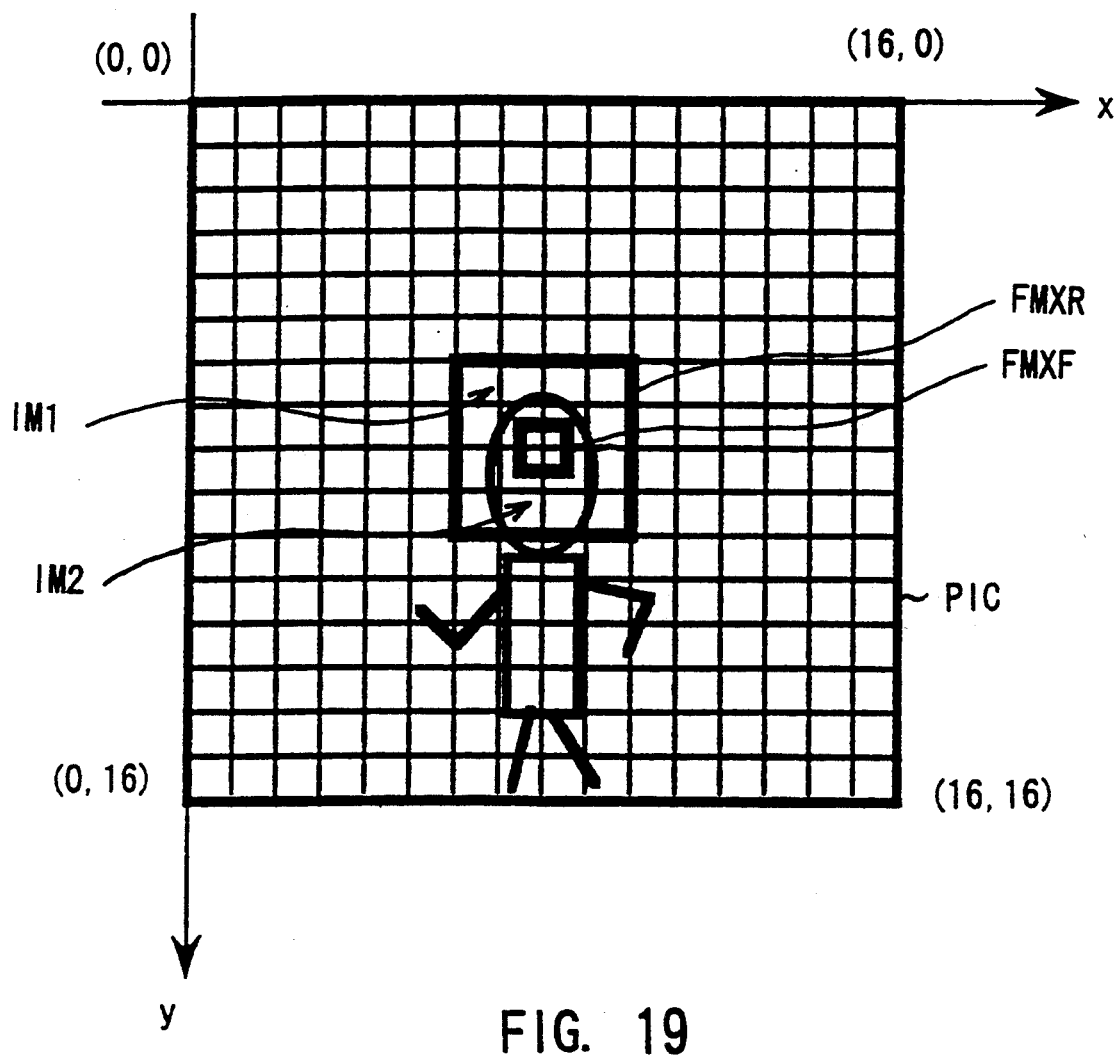
FIG. 19 is a schematic diagram explaining a setting of the main feature detecting measurement frame FMXF of, in particular the object part to be tracked, displayed in the picture plane PIC.

For example, as shown in FIG. 19, when a whole body of a walking man is displayed on the display plane PIC, a part of the face of the walking man is displayed in a portion of the standard measurement frame FMXR, and on the contrary the part of the face is seen in the whole main feature detecting measurement frame FMXF, the image in the main feature detecting measurement frame FMXF has only the hue angle components and brightness components expressing the feature of the face itself. On the contrary, the part of the face is displayed in a portion of the standard measurement frame FMXR, so that the frame FMXR has not only the hue angle components and the brightness level components expressing the feature of face, but also simultaneously the hue angle components and the brightness level components expressing the feature of the background except the face.

This means that when the histogram of the main feature detecting measurement frame FMXF is calculated to detect the frequency characteristic thereof, only the hue angle components H1 to H6 depicting the feature of the face without hue angle components of all the hue angles 0° to 359° on the hue signal. Similarily, it means that concerning the luminance signal, all the luminance level components 0 to 255 are not generated and only the luminance components Y1 to Y6 corresponding to the feature of the face are generated.

Figure 20:
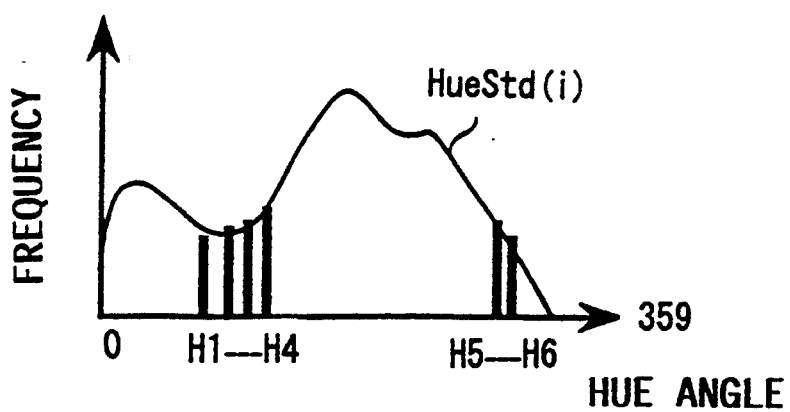
FIG. 20 is a characteristic curve diagram showing the hue frequency characteristic obtained from the standard measurement frame FMXR shown in FIG. 16.
Figure 21:
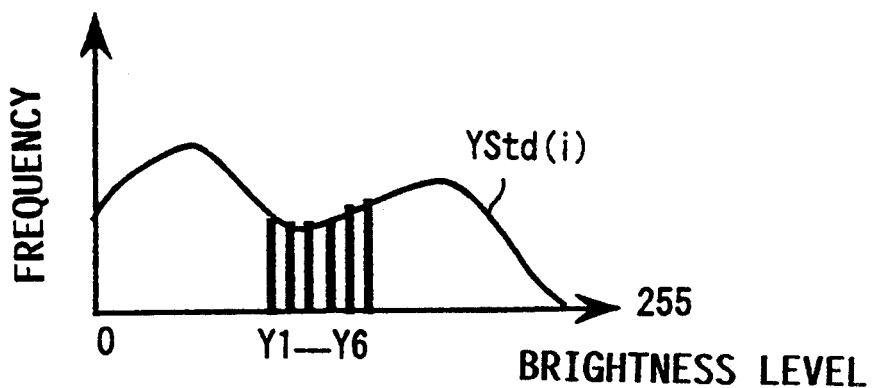
FIG. 21 is a characteristic curve diagram showing the brightness frequency characteristic obtained from the standard measurement frame FMXR of FIG. 16.

On the contrary, the standard measurement frame FMXR displays not only the image of the face, but also the image of background, so that the hue signal not only contains as shown in FIG. 20 hue angle components H1 to H6 expressing the feature of the face, but also generates hue frequency characteristic Hue Std (i) having other hue angle components. Similarly, as shown in FIG. 21 the brightness signal of the standard measurement frame FMXR contains brightness level components Y1 to Y6 depicting the feature of part of the face, and brightness frequency characteristic YStd (i) having other brightness level components is generated.

After the tracking signal processing circuit 16 memorizes the names H1 to H6 and Y1 to Y6 of components of frequency characteristic of the image portion of the main feature detecting measurement frame FMXF in the step SP12A, it proceeds to the step SP12B to pickup only the frequency characteristic data of the component names expressed by the main feature data of the frequency characteristic data of the brightness signal and hue signal within the standard measurement frame FMXR; suppose other data as 0 (0; and memorize those data as a standard feature pattern.

Then the tracking signal processing circuit 16 proceeds to the step SP13A, in which the address generation circuit 17 scans the position of the detection measurement frame FMXD to pickup only the frequency feature data of the name of components expressed by the main feature data of frequency feature data of the brightness signal and the hue signal by means of the detection measurement frame FMXD using the image information on the display plane PIC at unit of the detection measurement frame FMXD, and supposes other data as 0 (zero) to take in those data as a detection feature pattern.

In the method of FIG. 15, when the tracking signal processing circuit 16 enters the automatic tracking processing procedure RT3 and starts a recording (step SP11), in the step SP12A, as shown in FIG. 19, the operator sets the video camera to display part of the face of the man together with the background in the standard measurement frame FMXR, simultaneously only the face in the main feature detecting measurement frame FMXF. Then, as shown in FIGS. 17 and 18, in the step SP12A, the tracking signal processing circuit 16 obtains the hue frequency characteristic and brightness frequency characteristic having the name of components H1 to H6 and Y1 to Y6 depicting the feature of part of the face. As shown in FIGS. 20 and 21, in the step SP12B, the tracking signal processing circuit 16 has the values of the frequency characteristic components of the name of components H1 to H6 and Y1 to Y6 of the hue frequency characteristic Hue Std (i) and brightness frequency characteristic YStd (i) of the whole picture of the background and part of the face in the standard measurement frame FMXR, as well as generates the hue frequency characteristic and brightness frequency characteristic having a value of 0 (zero) of other frequency feature components.

Figure 22:
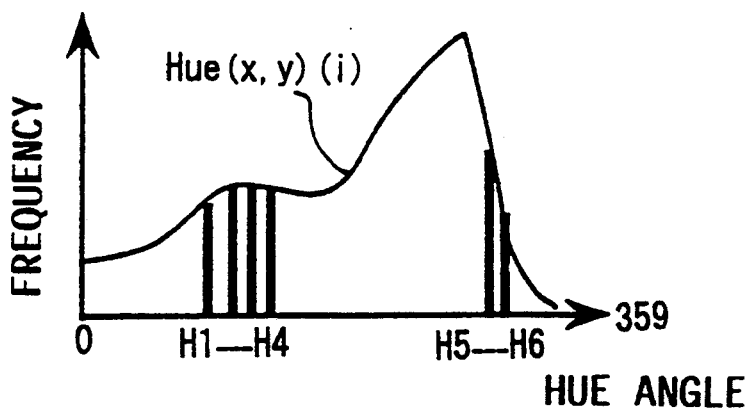
FIG. 22 is a characteristic curve diagram showing the hue frequency characteristic obtained when the display plane PIC is scanned by the detection measurement frame FMXD (FIG. 17)
Figure 23:
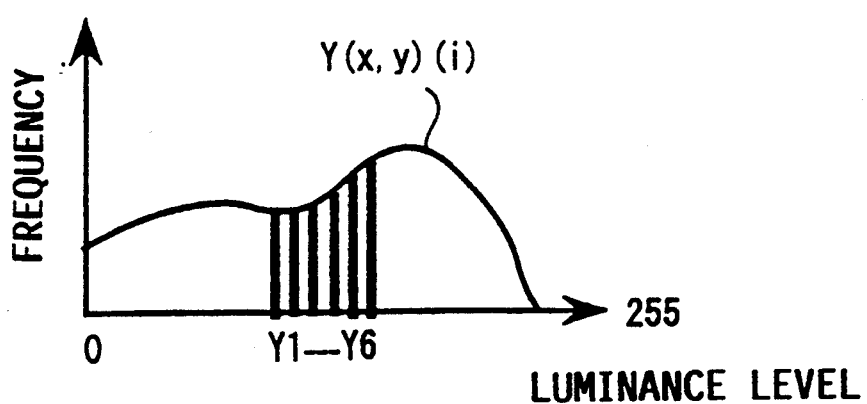
FIG. 23 is a characteristic curve diagram showing the brightness frequency characteristic obtained when the display plane PIC is scanned by the detection measurement frame FMXD (FIG. 12)

Subsequently, the tracking signal processing circuit 16 scans in the step SP13A the whole display plane PIC by means of the detection measurement frame FMXD (FIG. 12), and generates at respective scanning positions of the detection measurement frame FMXD as shown in FIGS. 22 and 23 the detection feature pattern containing only the frequency characteristic data of the component names H1 to H6 and Y1 to Y6 depicted by the main feature data of the detection hue frequency characteristic Hue (x, y) (i) and detection frequency characteristic Y (x, y) (i) and other component names of the frequency characteristic data of 0 (zero).

Then, in the step SP14, the tracking signal processing circuit 16 as shown by the equations (10) and (11) above, after determining the Euclidean distance between the standard feature pattern and the detection feature pattern, uses the equation (12) to determine the evaluation value J (x, y) of the sum. In the step SP15, supposing that the position of the measurement frame having the smallest evaluation value J (x, y) is the new position of the object, the tracking signal processing circuit 16 controls the panning drive motor 12C and the tilting drive motor 12B to move the position J (x, y) of the new object to the center of the display plane, then carries out in the step SP17 a repeating procedure for renewing the standard feature pattern.

In such a way, the tracking signal processing circuit 16, in the steps SP15 and SP16, determines a new object and drives the panning drive motor and the tilting drive motor to move the new object to the center of the display plane. Therefore, as shown in FIG. 24, the position of the detection measurement frame FMXD nearest to the feature of the main feature detecting measurement frame FMXD of many detection measurement frames FMXD obtained by the scanning is detected to carry out the panning and the tilting operation.

Figure 24:
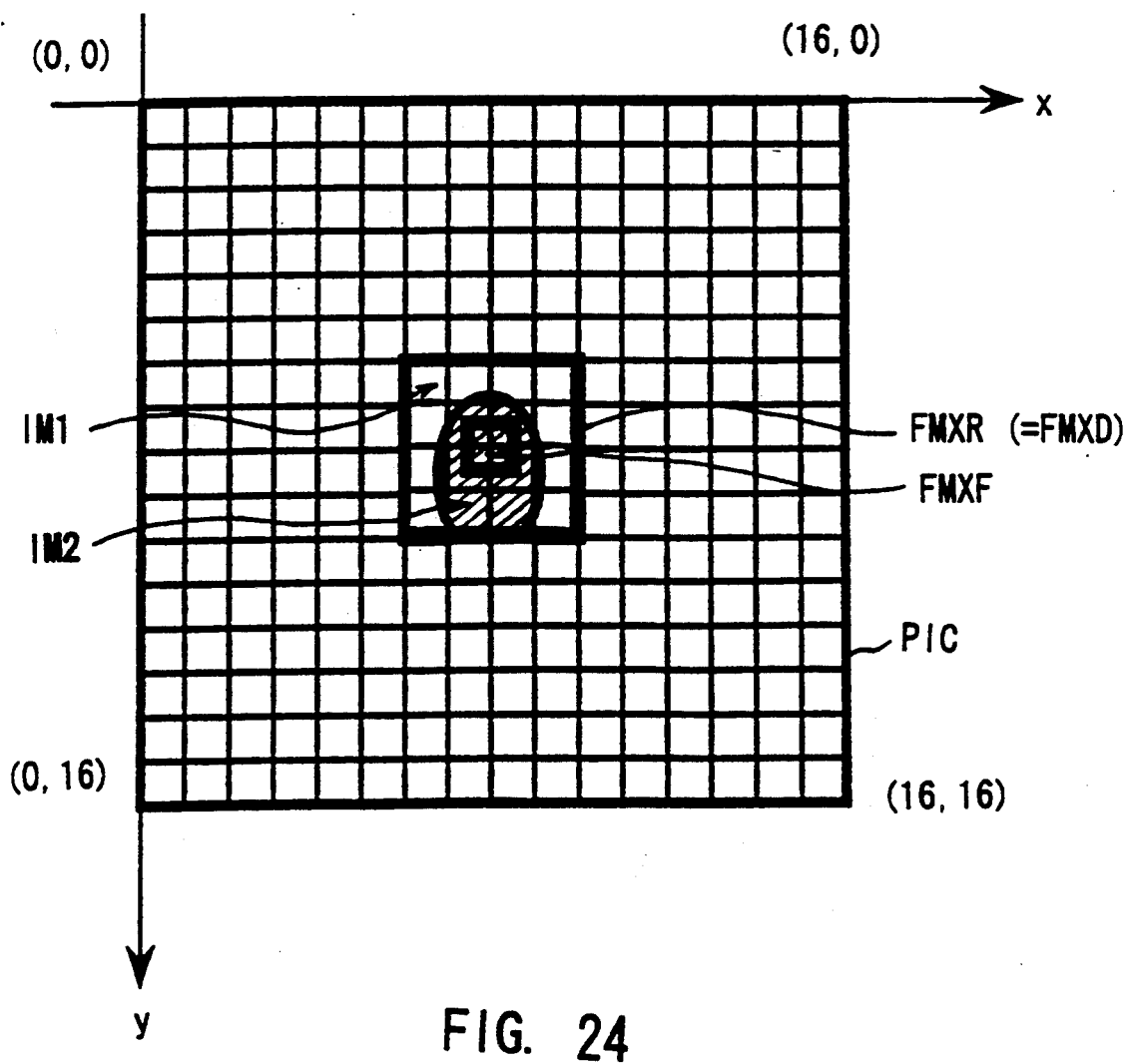
FIG. 24 is a schematic diagram explaining an automatic tracking of the particular object part.

As a result, as shown in FIG. 24, the tracking signal processing circuit 16 enable the camera to track the feature of the face part IM2 set in the main feature detecting measurement frame FMXF of the features in the standard measurement frame FMXR (detection measurement frame FMXD) containing background part IM1 and face part IM2 as a main comparison judgment condition. Consequently, it is possible to enable the video camera system VCS to effectively avoid generating a phenomenon in which erroneously it is attracted to the background part of the scene.

(4) Other Embodiments (4-1) In the second and the third embodiments described above, the present invention is applied to use the detection result of the moving position of the object in order to control the television camera to pan and tilt, so as to track the object at the central position of the display plane PIC. However, the same effect may be obtained if patterns based on the auto-focus information or auto-iris information are compared as the standard feature pattern and the detection feature pattern so as to determine the detection measurement frame FMXD having the largest similarity and automatically controls the focus or iris on the basis of the position information.

(4-2) In the embodiments above, the picture element information consisting of the display plane PIC is formed in the lens block section 1, and zooming, panning and tilting operations of the lens block section 1 makes the displayed image track the motion of the object. However, the same effect may be obtained if the imaging output signal S1 from the lens block section 1 is memorized in the image memory 15 and the memorized image data is zoomed, panned and tilted in data processing so as to form the display plane.

(4-3) In the third embodiment above, when the standard feature pattern and detection feature pattern are obtained in the steps SP12B and SP13A (FIG. 15), the value of the frequency feature data of the name of the component other than the component names expressed by the main feature data is made 0 (zero). However, it is possible to use a value other than 0 if necessary instead of the previous case. In short, it is possible to obtain the same effect if the value is replaced by the predetermined value.

While there has been described in connection with the preferred embodiments of the invention, it will be obvious to those skilled in the art that various changes and modifications may be made, therefore, it is the object to cover in the appended claims all such changes and modifications as fall within the true spirit and scope of the invention.

What is claimed is:

1. A video camera system comprising:
picture element information forming means for forming picture element information constructing a display plane on the basis of an imaging output signal of an object whose image is to be taken;
standard measurement frame setting means connected to said forming means for setting a standard measurement frame of a predetermined size at a predetermined position on said display plane;
detection measurement frame setting means connected to said forming means for setting a detection measurement frame of the predetermined size on said display plane;
standard frequency characteristic data forming means receiving said standard measurement frame and said picture element information for forming standard frequency characteristic data of brightness levels and hue angles on the basis of brightness information and hue information of the image within said standard measurement frame;
detection frequency characteristic data forming means receiving said detection measurement frame and said picture element information for forming detection frequency characteristic data of said brightness levels and said hue angles on the basis of said brightness information and said hue information of the image within said detection measurement frame;
detection measurement frame determining means receiving said standard frequency characteristic data and said detection frequency characteristic data for determining a similarity of said standard frequency characteristic data and said detection frequency characteristic data in order to determine said detection measurement frame having said detection frequency characteristic data of a large similarity; and
picture element information change control means connected to said determining means for driving and controlling said picture element information forming means so as to enter image information of said determined detection measurement frame into said standard measurement frame.

2. A video camera system of claim 1, wherein:
said detection measurement frame setting means sets a plurality of detection measurement frames of different sizes from each other;
said detection frequency characteristic data forming means forms said detection frequency characteristic data from said plurality of detection measurement frames respectively;
said detection measurement frame determining means determines the detection measurement frame having said detection frequency characteristic data of the largest similarity in said detection frequency characteristic data of said plurality of detection measurement frames; and
said picture element information change control means zooming-controls said picture element information forming means in order to coincide the size of said detection measurement frame determined by said detection measurement frame determining means with the size of said standard measurement frame.

3. A video camera system of claim 2, wherein:
said detection measurement frame setting means sets said plurality of detection measurement frames at predetermined positions different each other on said display plane;
said picture element information change control means controls said picture element information forming means so as to enter the image information of said detection measurement frame into said detection measurement frame determined by said detection measurement frame determining means.

4. A video camera system of claim 3, wherein:
said standard measurement frame setting means forms said standard measurement frame at the center of said display plane.

5. A video camera system of claim 4, wherein:

said detection measurement frame determining means calculates a Euclidean distance between said standard frequency characteristic data and said detection, frequency characteristic data with respect to said plurality of detection measurement frames, and determines the detection measurement frame of said Euclidean distance as the detection measurement frame of the large similarity.

6. A video camera system, comprising:

picture element information forming means for forming picture elements constructing a display plane on the basis of an imaging output signal of an object whose image is to be taken;

standard measurement frame setting means connected to said forming means for setting a standard measurement frame of a first predetermined size at a predetermined position on said display plane;

detection measurement frame setting means connected to said forming means for setting a detection measurement frame of the first predetermined size on said display plane;

main feature detection measurement frame setting means receiving said standard measurement frame and connected to said forming means for setting a measurement frame for main feature detection of a second predetermined size within said standard measurement frame;

main feature data forming means receiving said measurement frame for main feature detection and said imaging output signal for forming main feature data being names of frequency characteristic components of brightness levels and hue angles on the basis of brightness information and hue information of the image within said measurement frame for said main feature detection;

standard frequency data forming means receiving said standard measurement frame for forming standard frequency characteristic data having standard frequency characteristic data components being names of said frequency characteristic components expressed by said main feature data in said standard frequency characteristic data of said brightness levels and said hue angles on the basis of said brightness information and said hue information of the image within said standard measurement frame, and determining the value of the standard frequency characteristic data components being a name of other frequency characteristic components as a predetermined value;

detection frequency characteristic data forming means connected to said main feature data forming means and said standard frequency data forming means for forming detection frequency characteristic data having detection frequency characteristic data components being names of said frequency characteristic components expressed by said main feature data in said detection frequency characteristic data of said brightness levels and said hue angles on the basis of said brightness information and said hue information of the image within said detection measurement frame, and determining the value of the standard frequency characteristic data components being names of the other frequency characteristic components as the predetermined value;

detection measurement frame determining means connected to said detection frequency characteristic data forming means for determining a similarity of said standard frequency characteristic data and said detection frequency characteristic data in order to determine said detection measurement frame having said detection frequency characteristic data of a large similarity; and picture element information change control means connected to said determining means for driving and controlling said picture element information forming means so as to enter image information of said determined detection measurement frame into said standard measurement frame.

7. A video camera system of claim 6, wherein:

said detection measurement frame setting means sets a plurality of detection measurement frames of different sizes each other;

said detection frequency characteristic data forming means forms said detection frequency characteristic data from said plurality of detection measurement frames respectively;

said detection measurement frame determining means determines the detection measurement frame having said detection frequency characteristic data of the largest similarity in said detection frequency characteristic data of said plurality of detection measurement frames; and said picture element information change control means zooming-controls said picture element information forming means in order to coincide a size of said detection measurement frame determined by said detection measurement frame determining means with a size of said standard measurement frame.

8. A video camera system of claim 7, wherein:

said detection measurement frame setting means sets said plurality of detection measurement frames at predetermined positions different each other on said display plane;

said picture element information change control means controls said picture element information forming means so as to enter the image information of said detection measurement frame into said detection measurement frame determined by said detection measurement frame determining means.

9. A video camera system of claim 8, wherein;

said standard measurement frame setting means forms said standard measurement frame at the center of said display plane.

10. A video camera system of claim 9, wherein:

said detection measurement frame determining means calculates a Euclidean distance between said standard frequency characteristic data and said detection frequency characteristic data with respect to said plurality of detection measurement frames, and determines the detection measurement frame of said Euclidean distance as the detection measurement frame of the large similarity.

11. A video camera apparatus, comprising:

a lens for focusing light from an object whose image is to be taken;

an imaging element for converting the light from said lens into an electric signal;

picture element information forming means for forming picture element information constructing a display plane on the basis of an output signal from said imaging element;

standard measurement frame setting means connected to said forming means for setting a standard detection measurement setting means connected to said forming means for setting a detection measurement frame of the predetermined size on said display plane;

standard frequency characteristic data forming means receiving said standard measurement frame and said picture element information for forming standard frequency characteristic data of brightness levels and hue angles on the basis of brightness information and hue information of the image within said standard measurement frame;

detection frequency characteristic data forming means receiving said detection measurement frame and said picture element information for forming detection frequency characteristic data of said brightness levels and said hue angles on the basis of said brightness information and said hue information of the image within said detection measurement frame;

detection measurement frame determining means receiving said standard frequency characteristic data and said detection frequency characteristic data for determining a similarity of said standard frequency characteristic data and said detection frequency characteristic data in order to determine said detection measurement frame having said detection frequency characteristic data of a large similarity; and picture element information change control means connected to said determining means for driving and controlling said picture element information forming means so as to enter the picture element information of said determined detection measurement frame into said standard measurement frame.

12. A video camera apparatus of claim 11, wherein:
said detection measurement frame setting means sets a plurality of detection measurement frames of different sizes each other;

said detection frequency characteristic data forming means forms said detection frequency characteristic data from said plurality of detection measurement frames respectively;

said detection measurement frame determining means determines the detection measurement frame having said detection frequency characteristic data of the largest similarity in said detection frequency characteristic data of said plurality of detection measurement frames; and said picture element information change control means zooming-controls said picture element information forming means in order to coincide a size of said detection measurement frame determined by said detection measurement frame determining means with a size of said standard measurement frame.

13. A video camera apparatus of claim 12, wherein:
said detection measurement frame setting means sets said plurality of detection measurement frames at predetermined positions different each other on said display plane;

said picture element information change control means controls said picture element information forming means so as to enter the image information of said detection measurement frame into detection measurement frame determined by said detection measurement frame determining means.

14. A video camera apparatus of claim 13, wherein;

said standard measurement frame setting means forms said standard measurement frame at the center of said display plane.

15. A video camera apparatus of claim 14, wherein:
said detection measurement frame determining means calculates a Euclidean distance between said standard frequency characteristic data and said detection frequency characteristic data with respect to said plurality of detection measurement frames, and determines the detection measurement frame of said Euclidean distance as the detection measurement frame of the large similarity.

16. A video camera apparatus, comprising;
a lens for focusing a light from an object whose image is to be taken;

an imaging element for converting the light from said lens into an electric signal;

picture element information forming means for forming picture element information constructing a display plane on the basis of an output signal from said imaging element;

standard measurement frame setting means connected to said forming means for setting a standard measurement frame of a first predetermined size at a predetermined position on said display plane;

detection measurement frame setting means connected to said forming means for setting a detection measurement frame of the first predetermined size on said display plane;

main feature detection measurement frame setting means receiving said standard measurement frame and connected to said forming means for setting a measurement frame for main feature detection of a second predetermined size within said standard measurement frame;

main feature data forming means receiving said measurement frame for main feature detection and said picture element information for forming main feature data being names of frequency characteristic components of brightness levels and hue information of the image within said measurement frame for said main feature detection;

standard frequency data forming means receiving said standard measurement frame for forming standard frequency characteristic data having standard frequency characteristic data components being names of said frequency characteristic components expressed by said main feature data in said standard frequency characteristic data of said brightness levels and said hue angle on the basis of said brightness information and said hue information of the image within said standard measurement frame, and determining a value of the standard frequency characteristic data components being names of other frequency characteristic components as a predetermined value;

detection frequency characteristic data forming means connected to said main feature data forming means and said standard frequency data forming means for forming said detection frequency characteristic data having detection frequency characteristic data components being name of said frequency characteristic components expressed by said main feature data in said detection frequency characteristic data of said brightness levels and said hue angles on the basis of said brightness information and said hue information of the image within said detection measurement frame, and determining the value of the standard frequency characteristic data components being names of the other frequency characteristic components as the predetermined value;

detection measurement frame determining means receiving said standard frequency characteristic data and said detection frequency. characteristic data for determining the similarity of said standard frequency characteristic data and said detection frequency characteristic data in order to determine said detection measurement frame having said detection frequency characteristic data of a large similarity; and picture element information change control means connected to said determining means for driving and controlling said picture element information forming means so as to enter image information of said determined detection measurement frame into said standard measurement frame.

17. A video camera apparatus of claim 16, wherein:
said detection measurement frame setting means sets a plurality of detection measurement frames of different sizes each other;

said detection frequency characteristic data forming means forms said detection frequency characteristic data from said plurality of detection measurement frames respectively;

said detection measurement frame determining means determines the detection measurement frame having said detection frequency characteristic data of the largest similarity in said detection frequency characteristic data of said plurality of detection measurement frames; and said picture element information change control means zooming-controls said picture element information forming means in order to coincide a size of said detection measurement frame determined by said detection measurement frame determining means with a size of said standard measurement frame.

18. A video camera apparatus of claim 17, wherein:
said said detection measurement frame setting means set a plurality of detection measurement frames at predetermined positions different each other on said display plane;

said picture element information change control means controls said picture element information forming means so as to enter the image information of said detection measurement frame into said detection measurement frame determined by said detection measurement frame determining means.

19. A video camera apparatus of claim 18, wherein;
said standard measurement frame setting means forms said standard measurement frame at the center of said display plane.

20. A video camera apparatus of claim 19, wherein:
said detection measurement frame determining means calculates a Euclidean distance between said standard frequency characteristic data and said detection frequency characteristic data with respect to said plurality of detection measurement frames, and determines the detection measurement frame of said Euclidean distance as the detection measurement frame of the large similarity.

21. A tracking method for forming a brightness feature pattern and hue feature pattern on the basis of a brightness signal Y and a hue signal HUE of respective picture elements taken into a picture memory in a brightness histogram generating apparatus and a hue histogram generating apparatus so as to control a zooming-motion of a lens block in optimum condition, comprising:

first step for initializing a field number FN to FN=O, and then waiting to release a recording pause button RECPAUSE by a user and to start recording;

second step for memorizing a frequency characteristic of the brightness signal Y and the hue signal HUE within a standard measurement frame at a central position of a display plane as a standard feature pattern, when starting the recording;

third step for incrementing the field number FN to FN+i, taking a brightness frequency characteristic YStd (i) and a hue frequency characteristic HueStd (i) with respect to respective measurement frames FMX1, FMX2, and FMX3 while sequentially switching a measurement frame (FMX) to a plurality of measurement frames of different sizes from each other FMX1, FMX2, and FMX3, selecting there measurement frames, composed of a small measurement frame FMX1 being a small area having an unit area AR, a middle measurement frame FMX2 being a middle area having a plurality of unit areas, and a large measurement frame FMX3 being a large area having a plurality of unit areas the number of which is larger than said middle area, and taking in data of said respective measurement frame FMX1, FMX2, and FMX3 as Small, Middle, and Large detection feature patterns, respectively;

fourth step for determining a Euclidean distance between the standard feature pattern and the detection feature pattern with respect to brightness and hue, and setting the sum of those as Jsmall, Jmiddle, and Jlarge;

fifth step for determining a size of the measurement frame of a smallest evaluation value to the size of new object to be taken an image;

sixth step for controlling a zooming-motor so that the size of a new measurement frame becomes the size of a middle; and seventh step of renewing standard frequency characteristic data of the brightness signal and the hue signal within the new measurement frame as the standard feature pattern.

* * * * *

UNITED STATES PATENT AND TRADEMARK OFFICE
CERTIFICATE OF CORRECTION

PATENT NO. : 5,355,163

DATED : October 11, 1994

INVENTOR(S) : Tadafusa Tomitaka

Page 1 of 2

It is certified that error appears in the above-indentified patent and that said Letters Patent is hereby corrected as shown below:

```
Col. 1, line 40, after "According" insert --to--
        line 42, after "of" insert --a--
Col. 2, line 23, change ":a" to --: a--
Col. 3, line 17, delete "of"
Col. 4, line 68, after "circuit" insert --8.--
Col. 5, line 6, change "128" to --12B--
        line 29, before "L" insert --The--
        line 55, change "a meaningful of" to --meaningful--
Col. 6, line 30, delete "the" first occurrence
Col. 7, line 46, change "characteristic" to --characteristics--
Col. 8, line 11, before "using" insert --,--
        line 29, change "Euclidjan" to --Euclidean--
Col. 10, line 29, change "continuouity" to --continuity--
Col. 12, line 38, delete "," second occurrence
         line 60, delete ","
Col. 13, line 42, change "frame" to --frames--
         same line, change "resides" to --reside--
         line 48, change "Gives" to --gives--
Col. 14, line 30, delete "in"
Col. 15, line 64, change "(0;" to --(0)--
Col. 17, line 48, delete "in connection with"
```

UNITED STATES PATENT AND TRADEMARK OFFICE
CERTIFICATE OF CORRECTION

PATENT NO. : 5,355,163
DATED : October 11, 1994
INVENTOR(S) : Tadafusa Tomitaka

It is certified that error appears in the above-indentified patent and that said Letters Patent is hereby corrected as shown below:

Col. 19, line 4, delete ","
Col. 20, line 10, change "said" to --a--
        line 21, change "the" to --a--

Col. 21, line 40, delete "."
Col. 22, line 60, delete "said"
Col. 23, line 7, delete "."
        line 42, delete "said" second occurrence
        line 43, change "a" to --said--

Col. 24, line 17, after "start" insert --a--
        line 24, change "FN+i" to --FN+1--

Signed and Sealed this

Third Day of October, 1995

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,355,163
DATED : October 11, 1994
INVENTOR(S) : Tadafusa Tomitaka

It is certified that error appears in the above-indentified patent and that said Letters Patent is hereby corrected as shown below:

In the Claims:
Col. 20, line 68, after "standard" insert --measurement frame of a predetermined size at a predetermined position on said display plane;--

Signed and Sealed this

Twenty-first Day of November, 1995

Attest:

BRUCE LEHMAN

Attesting Officer

Commissioner of Patents and Trademarks